US008554051B2

(12) United States Patent
Lehman et al.

(10) Patent No.: US 8,554,051 B2
(45) Date of Patent: Oct. 8, 2013

(54) DATA STREAM STORAGE SYSTEM

(75) Inventors: Yonatan Lehman, Moshav Bet Gamliel (IL); Ronni Libson, Jerusalem (IL); Yoav Reshef, Kiryat Ono (IL); Netanel Lipschuetz, Jerusalem (IL); Rivka Vizen, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 13/138,009

(22) PCT Filed: Jan. 3, 2010

(86) PCT No.: PCT/IB2010/050001
§ 371 (c)(1),
(2), (4) Date: Jul. 15, 2011

(87) PCT Pub. No.: WO2010/079435
PCT Pub. Date: Jul. 15, 2010

(65) Prior Publication Data
US 2012/0099838 A1 Apr. 26, 2012

Related U.S. Application Data

(60) Provisional application No. 61/204,505, filed on Jan. 7, 2009.

(51) Int. Cl.
*H04N 9/80* (2006.01)
(52) U.S. Cl.
USPC .......................................................... 386/239
(58) Field of Classification Search
USPC .................. 386/201, 207, 208, 239, 240, 248
See application file for complete search history.

(56) References Cited

U.S. PATENT DOCUMENTS

| 5,864,682 | A | 1/1999 | Porter et al. |
| 6,178,242 | B1 | 1/2001 | Tsuria |

(Continued)

FOREIGN PATENT DOCUMENTS

| EP | 1 447 983 A1 | 8/2004 |
| EP | 1 486 979 A1 | 12/2004 |

(Continued)

OTHER PUBLICATIONS

Written Opinion of International Searching Authority for captioned application.

(Continued)

*Primary Examiner* — Tat Chio
(74) *Attorney, Agent, or Firm* — Husch Blackwell LLP

(57) ABSTRACT

A device for recording at least part of a data stream including a recording module to record records divided among a plurality of segments, the records including a record for each instance of an event type of the data stream, each segment covering a range of the positions in the data stream such that different segments cover different ranges of positions in the stream, record the value of each instance, create a refresh region in each segment, the refresh region including data from the most recently recorded instance of each event type, create a plurality of links between the records to enable traversing the records in position order, and create an indexing table including an entry for each segment, the entry for each segment including the range of the positions covered by the records of the one segment. Related apparatus and method claims are also included.

14 Claims, 11 Drawing Sheets

(56) References Cited

U.S. PATENT DOCUMENTS

| | | |
|---|---|---|
| 6,360,057 B1 * | 3/2002 | Tsumagari et al. ............ 386/241 |
| 7,106,946 B1 * | 9/2006 | Kato ............................. 386/241 |
| 7,305,170 B2 | 12/2007 | Okada et al. |
| 2001/0043799 A1 * | 11/2001 | Okada et al. .................... 386/95 |
| 2003/0165320 A1 * | 9/2003 | Ogawa et al. .................... 386/52 |
| 2005/0122974 A1 | 6/2005 | Hubler |
| 2006/0136981 A1 | 6/2006 | Loukianov |
| 2008/0021937 A1 | 1/2008 | Gates et al. |
| 2008/0247075 A1 | 10/2008 | Holtman |
| 2009/0154551 A1 * | 6/2009 | Tauchi et al. ............ 375/240.01 |

FOREIGN PATENT DOCUMENTS

| | | |
|---|---|---|
| EP | 1 744 317 A1 | 1/2007 |
| WO | WO 00/01149 | 1/2000 |
| WO | WO 01/35669 A1 | 5/2001 |
| WO | WO 03/010970 A2 | 2/2003 |
| WO | WO 2004/084448 A2 | 9/2004 |

OTHER PUBLICATIONS

Jim Rung Kim et al., "Fast Scene Change Detection for Personal Video Recorder" *IEEE Transactions on Consumer Electronics* (vol. 49, No. 3, Aug. 2003, pp. 683-688).

Xin Li et al., "Multi-Dimensional Range Queries in Sensor Networks" SenSys '03, (Nov. 5-7, 2003).

Wikipedia: "Data Stream Mining" (Feb. 27, 2008), available at http://web/archive.org/web/20080315042631/http://en.wikipedia.org/wiki/Data_stream_mining.

\* cited by examiner

Fig. 4
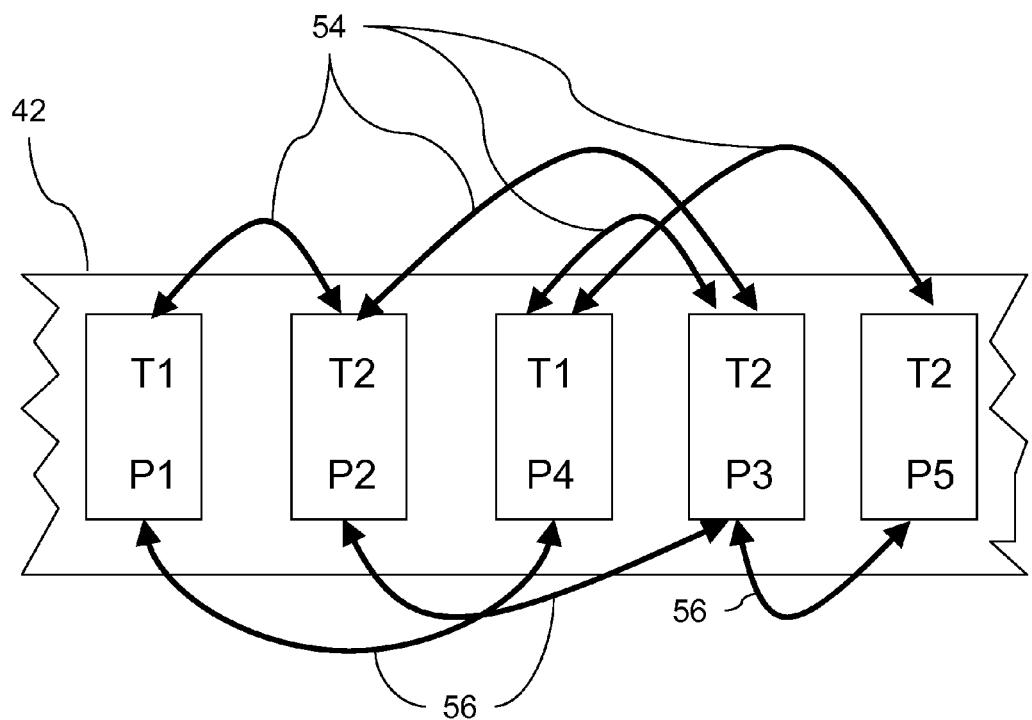
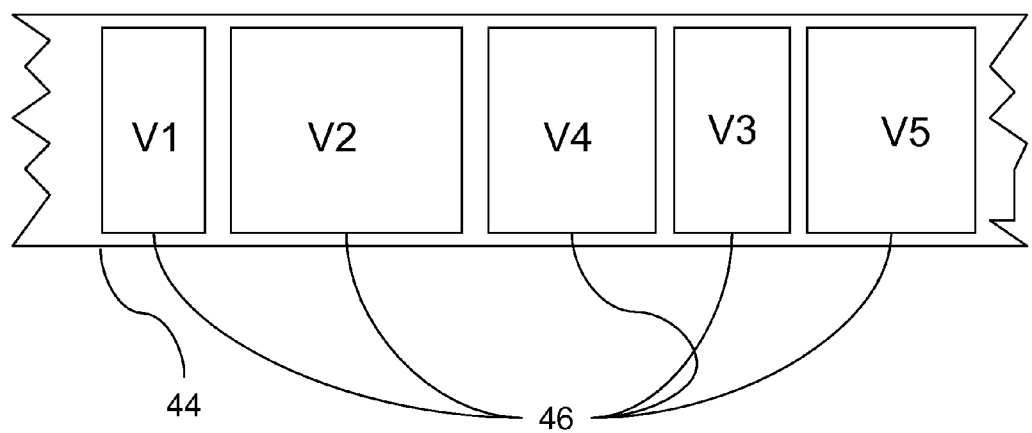

Fig. 6

MIT TABLE

| MBLOCK | POSITIONS | ASSIGNMENTS | GC | FILE |
|--------|-----------|-------------|-----|------|
| 1 | 1-521 | 1-3 | NO | 521 |
| 2 | 522-1035 | 4-9 | NO | 1035 |
| 3 | 1036-1689 | 10-15 | NO | 1689 |

DATA STREAM STORAGE SYSTEM

The present application is a 35 USC §371 application of PCT/IB2010/050001, filed on 3 Jan. 2010 and entitled "Data Stream Storage System", which was published on 15 Jul. 2010 in the English language with International Publication Number WO 2010/079435 and which relies for priority on U.S. Provisional Patent Application Ser. No. 61/204,505 of Lehman, et al., filed 7 Jan. 2009.

FIELD OF THE INVENTION

The present invention relates to data stream storage.

BACKGROUND OF THE INVENTION

The following references are believed to represent the state of the art:
U.S. Pat. No. 6,178,242 to Tsuria;
U.S. Pat. No. 7,305,170 to Okada, et al.;
US Published Patent Application 2005/0122974 of Hubler;
US Published Patent Application 2008/0021937 of Gates, et al.;
US Published Patent Application 2008/0247075 of Holtman;
PCT Published Patent Application WO 2000/01149 of NDS Limited;
PCT Published Patent Application WO 2001/35669 of NDS Limited;
PCT Published Patent Application WO 2003/10970 of NDS Limited; and
An article entitled "Fast Scene Change Detection for Personal Video Recorder" by Jung-Rim King, Sungjoo Suh, and Sanghoon Sull of Korea University, June 2003, IEEE.

SUMMARY OF THE INVENTION

The present invention, in certain embodiments thereof, seeks to provide an improved data stream storage system.

Thus, there is provided in accordance with still another embodiment of the present invention a device for recording at least part of a data stream therein, the data stream including a plurality of instances of a plurality of event types such that each one of the event types has at least one of the instances in the data stream, the data stream also including a plurality of positions such that each of the instances is located at one of the positions or within a range of the positions, each of the instances having an associated value, the device including a recording module to record a plurality of records divided among a plurality of segments, the records including a record for each of the instances, the record of each one of the instances including the one event type of the one instance and at least one of the positions identifying the one instance, each of the segments covering a range of the positions in the data stream such that different segments cover different ranges of the positions, record the value of each one of the instances such that the record of the one instance includes the value of the one instance, or the value of the one instance is stored externally to the record of the one instance, the record of the one instance including a reference to the externally stored value of the one instance, create a refresh region in each of the segments, the refresh region including data from a most recently recorded instance of each one of the event types such that the refresh region includes a plurality of records including a record for each one of the event types, wherein the refresh region record of the one event type includes the at least one position identifying the most recently recorded instance of the one event type, the one event type, and the value of the most recently recorded instance of the one event type or a reference to the value of the most recently recorded instance of the one event type, create a plurality of links between the records to enable traversing the records in position order, and create an indexing table including an entry for each of the segments, the entry for each one of the segments including the range of the positions covered by the records of the one segment.

Further in accordance with an embodiment of the present invention, the device includes a scanning module to find a particular one of the recorded instances identified by a desired position of the positions by searching the indexing table to find a particular segment of the segments including the desired position, and follow the links of the particular segment until the particular instance identified by the desired position is found.

Still further in accordance with an embodiment of the present invention the scanning module is operative to use the refresh region of the one segment to ascertain the value of any one of the event-types in the position range of the one segment by scanning from the refresh region of the one segment instead of from the beginning of the data stream.

Additionally in accordance with an embodiment of the present invention the arrival order of the instances arriving at the recording module may be out of position order, the recording module is operative to record the records of the one segment by appending the records to the one segment the arrival order of the instances, and the recording module is operative to create the links so that the records may be traversed in position order even when the records of the instances are recorded out of position order.

Moreover in accordance with an embodiment of the present invention the recording module is operative to record the records of one of the segments in a first file and the records of another one of the segments in a second file.

Further in accordance with an embodiment of the present invention the recording module is operative to create the refresh region at the beginning of each one of the segments such that the refresh region record of the one event type of the one segment includes the at least one position identifying the most recently recorded instance of the one event type recorded by the recording module in a previous one of the segments, and the value of the most recently recorded instance of the one event type recorded in the previous one segment or a reference to the value of the most recently recorded instance of the one event type recorded in the previous one segment, wherein the positions included in the records of the previous one segment are earlier positions in the stream than the positions included in the records of the one segment.

Still further in accordance with an embodiment of the present invention the links include a plurality of bidirectional links between nearest neighbors of the records, independent of the event-types, in the one segment, the nearest neighbors being nearest neighbors the positions included in the records, and a plurality of bidirectional links between nearest neighbors of the records of the same one of the event types in the one segment.

Additionally in accordance with an embodiment of the present invention the links include a plurality of backward links from the records of the refresh region of the one segment to at least some of the records of the previous segment, wherein the records of the previous segment do not include any forward links to the records of the refresh region of the one segment, a direction of the forward links and the backward links being defined with reference to a direction of increase of the positions.

Moreover in accordance with an embodiment of the present invention the segments do not include any links between the records of the one segment and the records of the previous segment.

Further in accordance with an embodiment of the present invention, the device includes a purging module to receive a request to delete some of the records, the positions included within the some records having a range between a first position of the positions and a second position of the positions, check the indexing table to identify at least one of the segments having a range of the positions totally within the range between the first position and the second position, delete the at least one segment, and update the indexing table to reflect the deletion of the at least one segment.

Still further in accordance with an embodiment of the present invention the purging module is operative to prior to deleting the at least one segment, update at least some of the links included in the records of the refresh region of a first segment of the segments, the first segment being adjacent in position order to the at least one segment.

Additionally in accordance with an embodiment of the present invention the recording module is operative to first create the records of the previous segment and then create the records of the refresh region of the one segment, after the recording module starts creating the records of the refresh region of the one segment, a late arrival instance of the instances arrives at the recording module, the late arrival instance having a position belonging to the previous segment, the recording module is operative to add the late arrival instance to the previous segment, and the recording module is operative to update at least some of the links in the previous segment and the one segment as a result of adding the late arrival instance to the previous segment.

Moreover in accordance with an embodiment of the present invention the recording module is operative to update at least part of the records of the refresh region of the one segment to reflect the additional of the late arrival instance to the previous segment.

Further in accordance with an embodiment of the present invention the event types include at least one of the following an I-frame, a B-frame, a P-frame, a program map table, a control message and a program clock reference.

Still further in accordance with an embodiment of the present invention the event type is a data type.

There is also provided in accordance with still another embodiment of the present invention a method for recording at least part of a data stream, the data stream including a plurality of instances of a plurality of event types such that each one of the event types has at least one of the instances in the data stream, the data stream also including a plurality of positions such that each of the instances is located at one of the positions or within a range of the positions, each of the instances having an associated value, the method including recording a plurality of records divided among a plurality of segments, the records including a record for each of the instances, the record of each one of the instances including the one event type of the one instance and the at least one of the positions identifying the one instance, each of the segments covering a range of the positions in the data stream such that different segments cover different ranges of the positions, recording the value of each one of the instances such that the record of the one instance includes the value of the one instance, or the value of the one instance is stored externally to the record of the one instance, the record of the one instance including a reference to the externally stored value of the one instance, creating a refresh region in each of the segments, the refresh region including data from a most recently recorded instance of each one of the event types such that the refresh region includes a plurality of records including a record for each one of the event types, wherein the refresh region record of the one event type includes the at least one position identifying the most recently recorded instance of the one event type, the one event type, and the value of the most recently recorded instance of the one event type or a reference to the value of the most recently recorded instance of the one event type, creating a plurality of links between the records to enable traversing the records in position order, and creating an indexing table including an entry for each of the segments, the entry for each one of the segments including the range of the positions covered by the records of the one segment.

BRIEF DESCRIPTION OF THE DRAWINGS

The present invention will be understood and appreciated more fully from the following detailed description, taken in conjunction with the drawings in which:

FIG. 4 is a partly pictorial, partly block diagram view of the assignment file and value file of FIG. 3 with an assignment arriving out of position order;

FIG. 6 is a block diagram view of an mblock indexing table for use in the system of FIG. 1;

DETAILED DESCRIPTION OF AN EMBODIMENT

Figure 1:
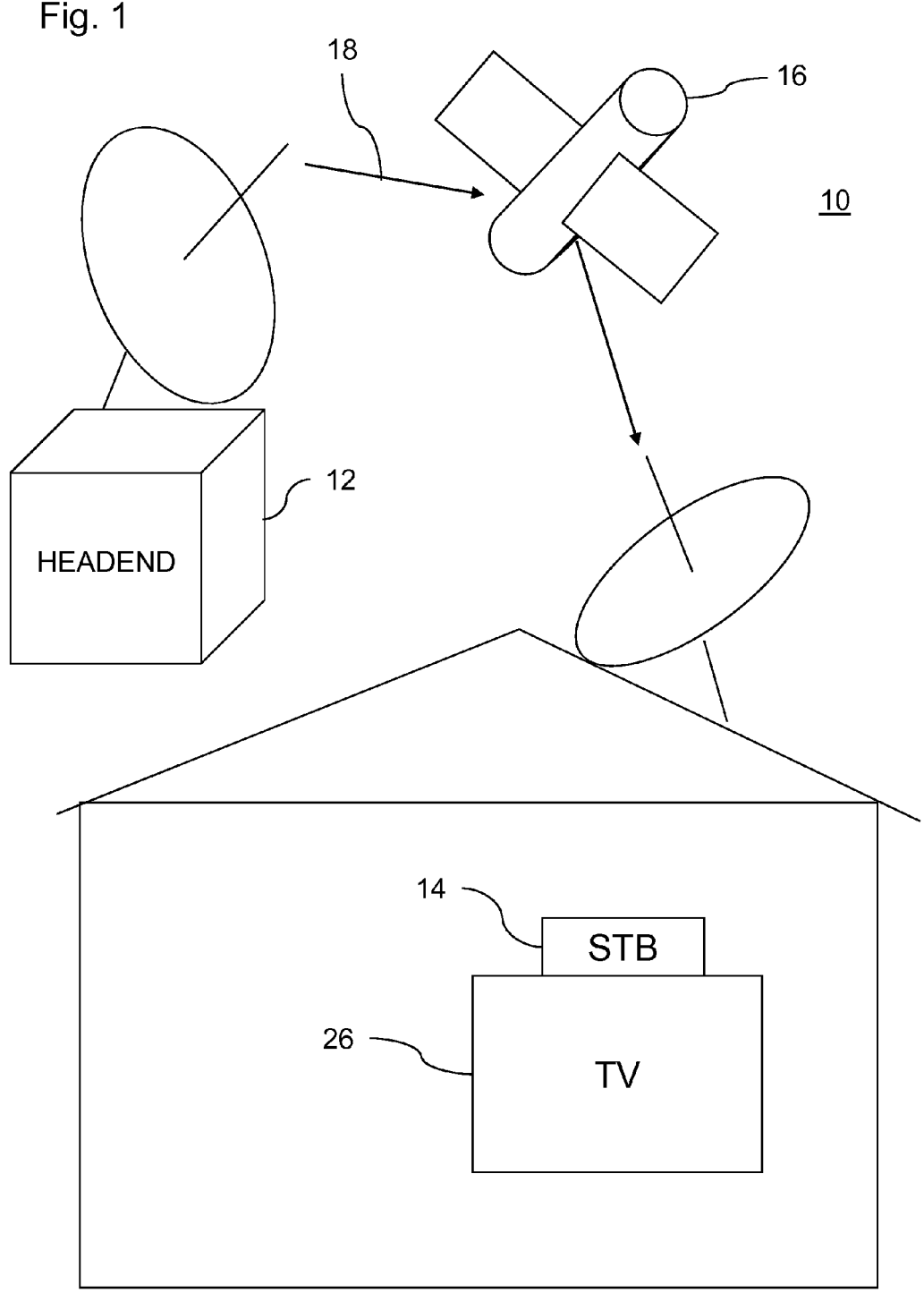
FIG. 1 is a partly pictorial, partly block diagram view of a data stream storage system constructed and operative in accordance with an embodiment of the present invention.

Reference is now made to FIG. 1, which is a partly pictorial, partly block diagram view of a data stream storage system 10 constructed and operative in accordance with an embodiment of the present invention.

One or more broadcast streams 18 are broadcast from a Headend 12 to the receiving and rendering devices of the subscribers. The receiving and rendering devices are typically set-top boxes 14. Persons skilled in the art will appreciate that, throughout the present application, a set-top box is used by way of example only, and that the present invention is not limited to a particular type of rendering device, but rather includes any suitable device. The communication method shown is satellite communication 16, but it will be appreciated by those ordinarily skilled in the art that any suitable communication method may be used, for example, but not limited to, cable, terrestrial, Internet protocol or any suitable combination thereof.

Persons skilled in the art will appreciate that, throughout the present application, a broadcast stream is used by way of example only, and that the present invention is not limited to a particular type of data stream, but rather includes any suitable data stream.

Figure 2:
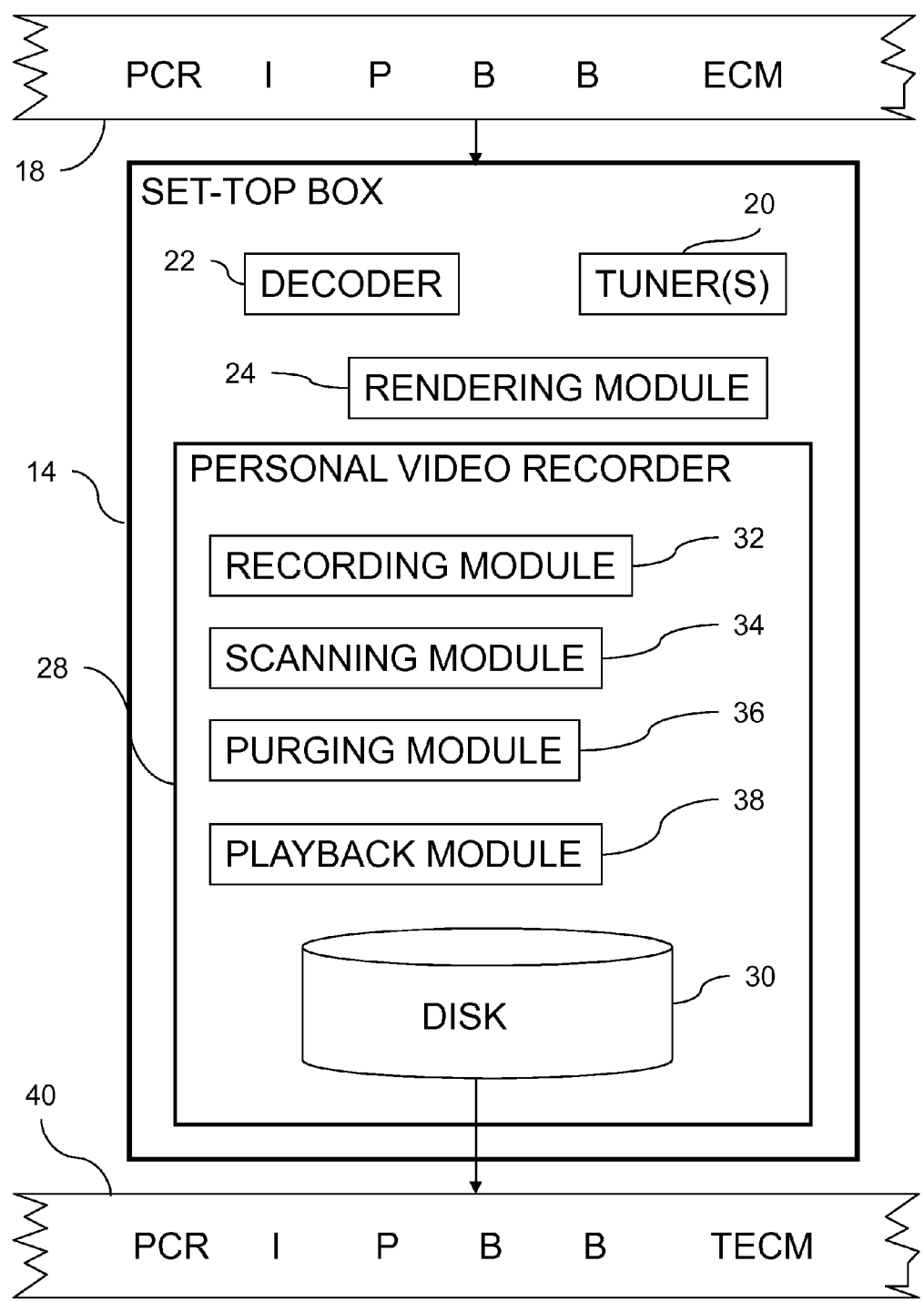
FIG. 2 is a partly pictorial, partly block diagram view of a set-top box for use in the stream storage system of FIG. 1.

Reference is now made to FIG. 2, which is a partly pictorial, partly block diagram view of the set-top box 14 for use in the stream storage system 10 of FIG. 1.

The set-top box 14 typically includes one or more tuners 20, decoders 22 and one or more rendering modules 24 to render video and audio on a display device such as a television 26 (FIG. 1). More than one rendering module 24 may be useful, for example but not limited to, for providing picture-in-picture technology. The set-top box 14 typically includes other components commonly found in a set-top box (not shown).

The set-top box 14 is typically implemented with the functionality of a personal video recorder (PVR) 28 including a storage device such as a hard disk 30 for recording video, audio and other data therein. It will be appreciated by those ordinarily skilled in the art that the storage device may be any suitable storage device, for example, but not limited to, RAM and USB flash. The PVR 28 typically includes a recording module 32, a scanning module 34, a purging module 36 and a playback module 38. The recording module 32 is operative to record part of the broadcast stream 18 in the disk 30. The scanning module 34 is operative to scan files in the disk 30 to find a particular position in a stream among other functions. The purging module 36 is operative to delete sections of a stored stream as necessary. The playback module 38 is operative to playback a recorded stream from the disk 30, typically in conjunction with the scanning module 34 and the rendering module 24 of the set-top box 14. The functionality of the PVR modules is described in more detail below. It will be appreciated that the set-top box 14 may be any suitable set-top box, receiving content by any suitable communication technology, as described above. The set-top box 14 may be part of a home network or other network. In accordance with one embodiment of the present invention the home network may include server and client set-top boxes, where the server set-top box performs the recording but not playback and the client set-top boxes perform playback but not recording. In such a case, the server set-top box does not need the rendering module 24 and other modules associated with playback.

The broadcast stream 18 received from the Headend 12 (FIG. 1) typically includes video/audio and other data for more than one channel. The decoder 22 includes functionality to select the program desired by the viewer from the broadcast stream 18 using techniques known to those ordinarily skilled in the art. The received broadcast stream 18 typically includes video and audio data as well as supporting metadata, for example, but not limited to, MPEG I, P and B frames, program clock references (PCRs) and DVB data and control messages used to secure the video such as entitlement control messages (ECMs) and entitlement management messages (EMMs). It will be appreciated by those ordinarily skilled in the art, that MPEG is used by way of example only and that any suitable data format may be used, for example, but not limited to, Direct Satellite System (DSS).

When a program included in the broadcast stream 18 is recorded to the disk 30, the video, audio and metadata is typically recorded to the disk for the desired program as a data stream 40.

ECMs in the broadcast stream 18 may be associated with a particular personal security device of the viewer (such as a smart card). Therefore, it is generally necessary to convert the ECMs to transformed ECMs (TECMs) as if the personal security device of the viewer is changed, the viewer can no longer playback the recorded program based on the original ECMs. Therefore, TECMs are stored in the disk 30 within the data stream 40 in place of the originally received ECMs. The creation of TECMs is described in more detail with reference to U.S. Pat. No. 6,178,242 to Tsuria.

Figure 3:
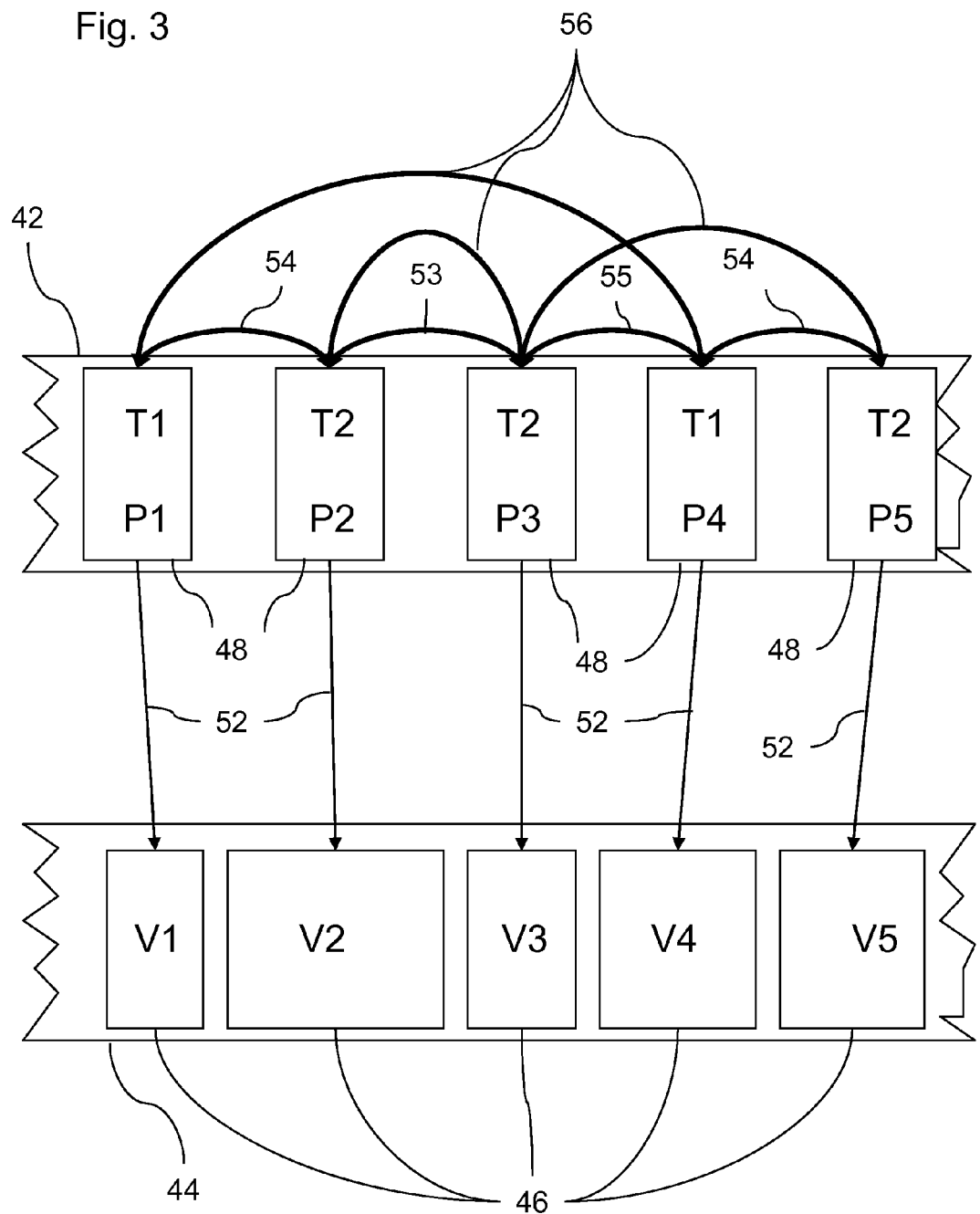
FIG. 3 is a partly pictorial, partly block diagram view of an assignment file and a value file in the system of FIG. 1.

Reference is now made to FIG. 3, which is a partly pictorial, partly block diagram view of an assignment file 42 and a value file 44 in the system 10 of FIG. 1.

The data stream 40 (FIG. 2) includes a plurality of instances of different event types T such that each event type has at least one instance in the data stream 40. Event types T1 and T2 are shown in FIG. 3. Each instance has an associated position P (positions from P1 to P5 are shown in FIG. 3) and an associated value V. For example, event type T1 at position P1 has a value V1, and event type T2 at position P2 has a value V2.

The position P may be determined in any suitable measurement unit, for example, but not limited to, time, byte in a bytes stream or packet reference at the start or end of the instance. The number of event types T is typically not limited. However, the number of event types may affect performance of the data stream storage system 10. Two event types T1 and T2 are shown for the sake of clarity. The values V may typically be any size. However, it will be appreciated by those ordinarily skilled in the art that the value may have a fixed size if required.

In an MPEG2 transport stream, the event types T would typically include an I-frame, B-frame, P-frame, a PMT and other tables, ECM or TECM packet, PCR, for example only. In an MPEG transport stream there are typically multiple instances/occurrences of each event type, for example every few seconds there is an ECM instance, every half a second an I-Frame and every 40 ms a PCR. However, it will be appreciated that the data stream 40 could include a single instance/occurrence of a particular event type, for example a program map table (PMT) in an MPEG2 transport stream. Each instance/occurrence is associated with a position (for example, packet number) and a value.

In an MPEG stream for example, an instance of event type T1 may apply over a number of packets, so position P1 is the packet reference identifying the start of the instance of event-type T1, and position P2 is the packet reference identifying the start of the instance of event-type T2 at position P2.

For convenience each event type has been termed a "variable" and each instance of the event type is termed an "assignment". Notionally, the system 10 models a series of assignments to variables over time (or position). If a variable does not have an assignment at a position X, then the "value" of the variable at a position X is defined as the value of the most recent assignment of the variable prior to the position X.

As described with reference to FIG. 2, the data stream 40 is recorded from the broadcast stream 18. The data stream 40 typically includes a stream of assignments which are continually being recorded and stored in the hard disk 30 (FIG. 2).

The data stream storage system 10 typically supports the following access functionality. Given a variable T at position P, the data stream storage system 10 is operative to return the value V and position of the next or previous assignment of the same variable T. Given a position P, the data stream storage system 10 is operative to return the previous or next assignment independent of the variable type. The data stream storage system 10 is operative to pass through the data stream 40 from any position to another position in position order (in forward or reverse order) and obtain the position and value of all variables between the two positions.

Although the assignments are ordered in the broadcast stream 18, the assignments may be presented for recording out of order, for example, when an ECM is transformed into a TECM a delay may occur. Nevertheless, the data stream storage system 10 is typically operative to perform the access functionality described above in position order.

It is generally necessary to assume a maximum delay between when an assignment occurs and when the assignment arrives for recording. For example, in an MPEG-2 stream a delay may be caused while a TECM is created from an ECM. It will be appreciated by those ordinarily skilled in the art that the "maximum delay" will depend on the constraints of the particular data stream, the processing being performed, and the constraints of the data stream storage system 10 for example, but not limited to, the allocated buffer space.

As recording of the data stream 40 may be an ongoing and possibly limitless process (for example, the data stream storage system 10 may be recording a live television transport stream), it is not practical to pass through the data in position order by sorting the information.

Also, as the data stream storage system 10 typically has to operate efficiently in a real time environment, the system 10 is typically efficient in terms of CPU, memory usage and disk access.

In order to provide the above access functionality, the data stream 40 typically includes two persistent structures generally stored in two separate files, the assignment file 42 and the value file 44.

The assignment file 42 lists details of the assignments without the associated values. The value file 44 includes the values which are referenced in the assignment file 42.

The value file 44 typically includes a plurality of variable size records 46 including the value associated with each assignment, for example, V1, V2 . . . V5. The values are typically stored in arrival order (as opposed to position order).

The assignment file 42 typically includes fixed sized records 48, one record 48 per assignment. Each record 48 typically includes the following information: the variable type (for example, I-frame, PCR); a reference to the value (associated with the assignment) in the value file 44, for example, but not limited to, the actual offset in the value file 44 of the value of the assignment; the length of the value (associated with the assignment) in the value file 44; and the position in stream (for example, 1, 1000, 1501). It will be appreciated by those ordinarily skilled in the art that some of the variables (particularly with a fixed record size), for example, but not limited to I-frames, may be stored in a different file and not in the assignment file 42 nor the value file 44.

The assignment file 42 includes bidirectional global links 54 between nearest neighboring assignment records 48 independent of the variable. The term "nearest neighboring assignment records" is defined herein as nearest neighbors according to the positions included in the records 48. So for example, the assignment record 48 at position P3 has a global link 53 to the assignment record 48 at position P2 and a global link 55 to the assignment record 48 at position P4. The assignment file 42 also includes bidirectional variable links 56 between nearest neighboring assignment records 48 of the same variable. So for example, the assignment record 48 of variable T2 at position P3 has the variable link 56 to the assignment record 48 at position P2 and the variable link 56 to the assignment record 48 at position P5. Therefore, each record 48 typically also includes the following information: the global link 54 to the previous nearest neighbor assignment record 48 (variable independent); the global link 54 to the next nearest neighbor assignment record 48 (variable independent); the variable link 56 to the previous nearest neighbor of the same variable; and the variable link 56 to the next nearest neighbor of the same variable.

The links 54, 56 typically reference the assignment in units of "assignment number". In other words, the links 54, 56, typically reference the assignment record 48 by the record number within the assignment file 42. However, it will be appreciated by those ordinarily skilled in the art that the links 54, 56 may use any suitable unit, for example, but not limited to, byte offset of the assignment records 48.

Based on the structures of the assignment file 42 and the value file 44, the following functionality is generally enabled. The forward and backward global links 54, allows the system to "walk" through all assignments in either direction. Similarly, the variable links 56 allows the system to "walk" through the assignments of a particular variable. Finding the value of a variable at any given position is achieved by starting at the beginning or end of the chain and following the links until the required position is found. However, it will be appreciated by those ordinarily skilled in the art that if the data stream storage system 10 is currently at a given position in the middle of the chain, the "walk" through the chain may start from the given current position. Storing data about the assignments in a separate file from the values allows the values to have variable length and making the assignment records 48 of fixed size enables simpler random access of the assignment records 48 in the assignment file 42. The assignments are recorded by appending the assignment data and values to the files 42, 44 in arrival order so that storage is very efficient. The use of a linked list allows the assignments to arrive out of position order, since the assignment data is appended to the assignment file 42 in arrival order, but the links 54, 56 are used to traverse the list in position order. Therefore, the assignment data and values in the assignment file 42 and value file 44 do not need to be reshuffled in the assignment file 42 and the value file 44, respectively.

As the storage is out of position order, the links 54, 56 are typically stored in a sliding window buffer (not shown) so that any manipulation of the links 54, 56 is performed in memory and not on the hard disk 30 (FIG. 2). The buffer is written to the hard disk 30 (FIG. 2) periodically. Efficient scanning is generally achieved by reading the data using buffers that read a large part of the chain in one read operation, and more significantly, typically one seek operation.

It will be appreciated by those ordinarily skilled in the art that if the values in a data stream are of fixed length, then the assignment file 42 and the value file 44 may be combined in to a single file including both assignment data and associated values in which the reference to the value file is obviously not required.

It should be noted that the assignments of FIG. 3 are shown as arriving in position order for the sake of clarity.

Reference is now made to FIG. 4, which is a partly pictorial, partly block diagram view of the assignment file 42 and value file 44 of FIG. 3 with an assignment arriving out of position order. The assignment of variable T2 having position P3 has arrived after the assignment at position P4. Therefore, the assignment having position P3 is added to the assignment file 42 after the assignment at position P4, and the value V3 is added to the value file 44 after value V4. The global links 54 and the variable links 56 still link the assignment records according to position order and not according to the order of arrival in the assignment file 42.

As the data chain of the data stream 40 grows, two main issues arise.

First, available disk space is reduced. Therefore, it would be advantageous to remove/purge unwanted/unused parts of the assignment file 42 and the value file 44. However, since the assignment records 48 are all part of a single file, (the assignment file 42), removing part of the data in the middle of a file is very inefficient.

Second, in order to find a given position in the assignment file 42, the chain must be traversed from the start or end of the chain. The access time becomes larger as the stream becomes longer.

Figure 5:
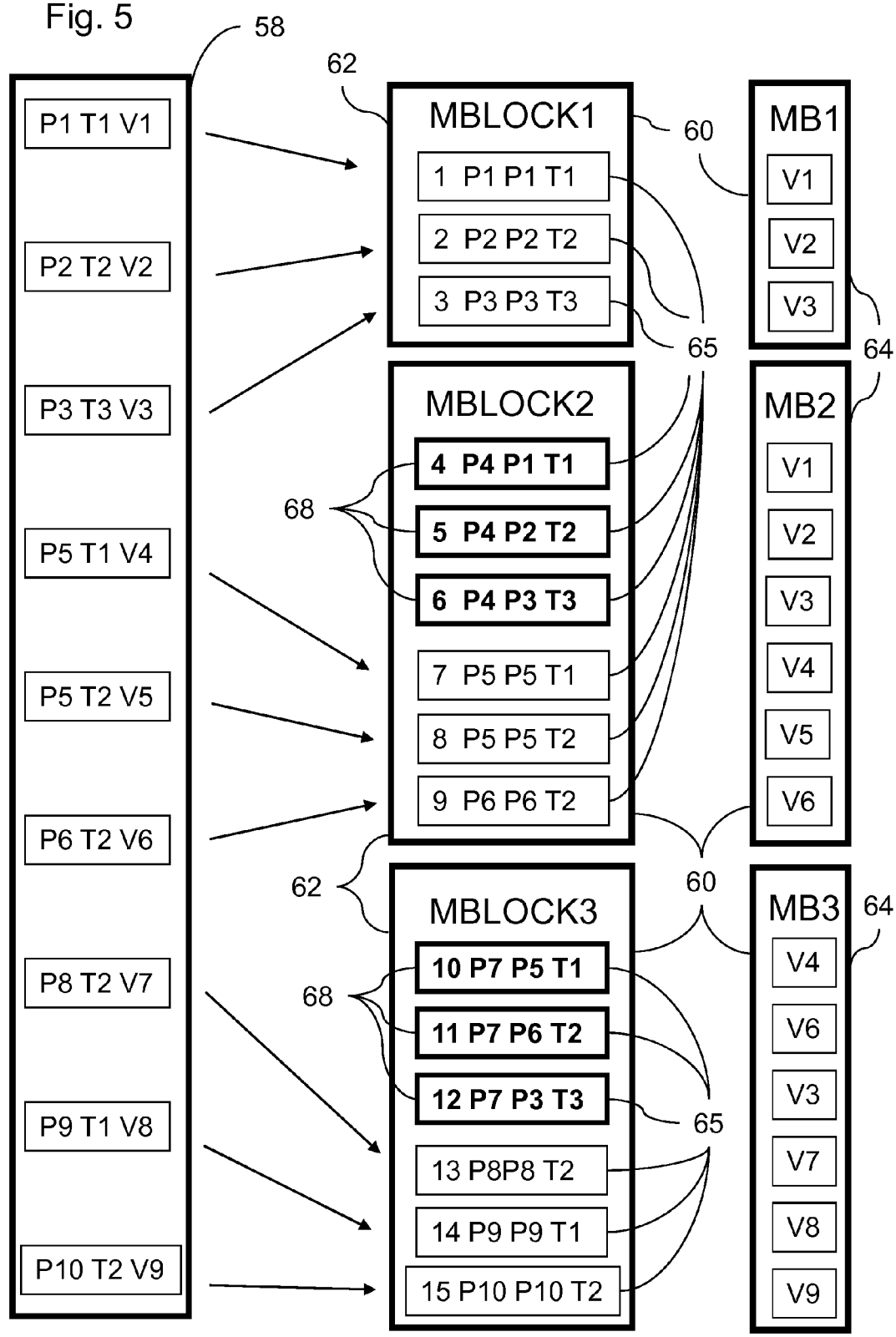
FIG. 5 is a partly pictorial, partly block diagram view of a data stream being recorded as a plurality of mblocks in the system of FIG. 1.

Reference is now made to FIG. 5, which is a partly pictorial, partly block diagram view of a data stream 58 being recorded as a plurality of mblocks 60 in the system 10 of FIG. 1.

The set-top box 14 (FIG. 2) is operative to record at least part of the data stream 58 in the hard disk 30.

Similar to the broadcast stream 18, the data stream 58 is typically received from the Headend 12 (FIG. 1) and typically includes video/audio and other data for more than one channel. The received data stream 58 typically includes video and audio data as well as supporting metadata.

Similar to the broadcast stream 18, the data stream 58 includes a plurality of instances ("assignments") of a plurality of event types ("variables") such that each variable has one or more assignments in the data stream 58. The data stream 58 also includes a plurality of positions such that each assignment is located at one position or within a range of the positions. Each assignment has an associated value.

Instead of using a single assignment file 42 and a single value file 44, the data stream 58 is recorded by the recording module 32 (FIG. 2) in a plurality of segments, referred to as the mblocks 60. The recording module 32 is operative to record a plurality of records 65 divided among the mblocks 60. The records 65 including a record 65 for each assignment. In other words, the data of one assignment is included in one record 65. The record 65 of each assignment typically includes the variable of the assignment and the position identifying the assignment and other data relating to the assignment described above with reference to the records 65 of the assignment file 42 of FIG. 3.

The recording module 32 typically also records the value of each assignment in mblocks 60 separately/externally to the records 65 of the assignments. Therefore, the record 65 of each assignment also typically includes a reference to the externally stored value of the assignment. Alternatively, the recording module 32 is operative to record the values in the record 65 for each assignment so that the reference to the value of the assignment in the record 65 is generally not needed.

The arrival order of the assignments arriving at the recording module 32 (FIG. 2) may be out of position order as described above. The recording module 32 is operative to record the records 65 for the assignments of an mblock 60 by appending the records 65 to the mblock 60 according to the arrival order of the assignments.

Each of the mblocks 60 includes records 65 of assignments having a certain range of positions from the data stream 58 so that each mblock 60 covers a range of positions in the data stream 58 such that different mblocks 60 cover different ranges of the positions. Therefore, data of each of the assignments is generally included in one, and only one, mblock 60 with the exception of assignments in refresh regions 68 discussed below. In other words, data of all the assignments within the position range of one mblock 60 are included within the one mblock 60 and not in another mblock 60 with the exception of assignments in the refresh regions 68.

The recording module 32 is operative to create links so that the records 65 within an mblock 60 are linked with bidirectional global links and variable links as described above with reference to FIGS. 3 and 4 so that the assignments/records 65 can be "walked" in position order within any mblock 60. The mblocks 60 are also typically ordered so that all the assignments/records 65 can be "walked" in position order from one mblock 60 to the next mblock 60. Links between the records 65 of different mblocks 60 are described in more detail with reference to FIG. 7. Therefore, the recording module 32 is typically operative to create the links between the records 65 to enable traversing the assignment records 65 in position order even when the records 65 of the assignments are recorded out of position order.

The assignments from the data stream 58 at positions P1 to P10 are divided among MBLOCK1, MBLOCK2 and MBLOCK3. The assignments from the data stream 58 with positions P1 to P3 are in MBLOCK1. The assignments from the data stream 58 with positions P5 to P6 are in MBLOCK2. The assignments from the data stream 58 with positions P7 to P10 are in MBLOCK3.

The recording module 32 is operative to typically store each mblock 60 in a separate set of files, that is, each mblock 60 has an assignment file 62 for the records 65 of the assignments, and a corresponding value file 64 for the values. It will be appreciated by those ordinarily skilled in the art that if the values in a data stream are of fixed length, then the assignment file 62 and the value file 64 may be combined in to a single file.

Each mblock file may be named based on an incremental index which is updated each time a new mblock is created, and/or based on the first or last position of the mblock. The suffix of the file may indicate whether the file is an assignment file 62 or a value file 64. The advantage of naming conventions of the mblock files is discussed in more detail below with reference to FIG. 6.

During recording, the assignments are typically recorded by the recording module 32 (FIG. 2) in the assignment files 62 and the values in the value files 64 in substantially the same way as described with reference to the assignment file 42 and the value file 44 of FIG. 3. Global and variable links are recorded in the assignment files 62 between assignment records 65 of each mblock 60. The recording of the assignments, and in particular, recording the links is described in more detail with reference to FIG. 7.

When a new mblock 60 is created by the recording module 32 (FIG. 2), the refresh region 68 is also created by the recording module 32 at the start/beginning of each mblock.

The refresh region 68 includes: one record 65 of a most recently recorded assignment for each variable recorded in the assignment file 62; and the current value of the variable at the position at which the mblock 60 starts being recorded in the value file 64.

The position assigned to the assignment records 65 in the refresh region 68 at the beginning of the new mblock 60 is generally the next position after the final position of the mblock 60 prior to the new mblock 60. In accordance with an alternative embodiment of the present invention, the position assigned to the assignment records 65 in the refresh region 68 at the beginning of the new mblock 60 is the position of the data stream 58 currently being processed when the new mblock 60 is created. The current value of a variable at the beginning of an mblock 60 is the most recent value the variable had in the previous mblock 60.

Therefore, the refresh region 68 typically includes one assignment record 65 for each variable recorded and the associated value. The assignment record 65 of the refresh region 68 in the assignment file 62 includes a reference to the associated value of the assignment in the value file 64. The reference to the associated value of the assignment record 65 may be a local reference which is relative to the individual value file 64 of a particular mblock 60, or a global reference which is relative to the accumulated length of the value files 64. For example, if three consecutive value files 64 have lengths 100, 105 and 90, respectively, a value in the third value file 64 with a local reference of "3" has a global reference of "208" (100+105+3).

The notation used in FIG. 5 for each assignment record 65, first shows the assignment/record number (records 65 in the refresh region 68 being considered as another assignment/record for this purpose), the current position, the position where the instance of the variable originally occurred (termed "original position") and then the variable. So for example "4 P4 P1 T1" means that the assignment/record number 4 has a current position P4, an original position P1 and a variable T1.

So for example, in MBLOCK2 the refresh region 68 includes an assignment record 65 for variables T1, T2 and T3. The current position at the start of MBLOCK2 is P4. The original positions that the instances of the variables occurred in MBLOCK1 are: position P1 for variable T1; P2 for variable T2; and P3 for variable T3. The current values of the variables T1, T2 and T3 are V1, V2 and V3, respectively.

In MBLOCK3 the refresh region 68 includes assignment records 65 for variables T1, T2 and T3. Even though variable T3 did not occur in MBLOCK2 (only as part of the refresh region 68), nevertheless, variable T3 is included in the refresh region 68 of MBLOCK3 so that if the data is scanned starting at MBLOCK3, for example, the current values of all the variables are known.

The current position and the original position are only generally different for records 65 in the refresh region 68. Therefore, the current position and the original position may act as a flag stating whether an assignment record 65 is a record 65 of a real assignment ("real record") or a "refresh" record 65 of an assignment ("refresh record"). It will be appreciated by those ordinarily skilled in the art that an explicit flag could also be used to identify records 65 in the refresh region 68.

Therefore, the recording module 32 (FIG. 2) is operative to create, in a current mblock 60, the refresh region 68 including a refresh region record 65 for each variable previously recorded in the assignment file(s) 62. For a particular variable, the refresh region record 65 typically includes: the position(s) identifying the most recently recorded assignment of the variable in the stream 58 (original position) recorded by the recording module 32 in the previous mblock 60; the current position; the variable; and the value of the most recently recorded assignment of the variable recorded in the previous mblock 60 (if the value is recorded in the assignment 62) or a reference to the value of the most recently recorded assignment of the variable recorded in the previous mblock 60. By way of clarification the positions included in the records 65 of the previous mblock 60 are earlier positions in the data stream 58 than the positions included in the records 65 of the current mblock 60.

The assignment records 65 in the refresh region 68 are linked using forward variable links to the real assignment records 65 in the same mblock 60. Backward links from the refresh region 68 to the previous mblock 60 are also included. The links are described in more detail with reference to FIG. 7.

By using the refresh regions 68, the value of any variable in the position range of one of the mblocks 60 can be ascertained by scanning from the start of the mblock 60 instead of from the beginning of the stream 58. Since each mblock 60 is represented by a bounded range, the search time is bounded by the length of the mblock 60 and not by the length of the entire stream 58.

Additionally or alternatively, a refresh region could be made at the end of each mblock 60 (instead of, or in addition to, the refresh region 68), with the values of all the variables at the last position represented by the mblock 60. This would allow scanning the chain backwards, which is particularly useful when the required position is closer to the end of the mblock 60. The rest of the description assumes that a refresh region is not made at the end of the mblocks 60.

Therefore, in general the recording module 32 (FIG. 2) is operative to create at least one refresh region, somewhere, in each of the mblocks 60. Each refresh region includes data from the most recently recorded assignment of each variable such that the refresh region includes a plurality of records 65 including a record 65 for each variable. The refresh region record 65 for each variable includes: the position(s) identifying the most recently recorded assignment of the variable; the variable; the value of the most recently recorded assignment of the variable (if the values are recorded in the records 65) or a reference to the value of the most recently recorded assignment of the variable (if the values are recorded in the value file 64); and other relevant data described above with reference to the records 65 of the refresh region 68. For efficiency, the recording module 32 (FIG. 2) stores in memory the most recent assignment data (position and value) of each variable. This information is used to create the refresh region 68, described in more detail with reference to FIG. 7.

It will be appreciated by those ordinarily skilled in the art that some of the event types, for example, but not limited to I-frames, may be stored in a different file and neither in the assignment file 62 nor the value file 64. The different file may or may not include: refresh regions depending on how the different file is structured; and/or global links if the assignments always arrive in position order; and/or variable links if walking through variables is not important.

The assignments recorded in MBLOCK2 at record 7 and 8 both have the same position P5 which may occur, for example, when the assignments of variables T1 and T2 at position P5 are located in the same packet.

Figure 6:
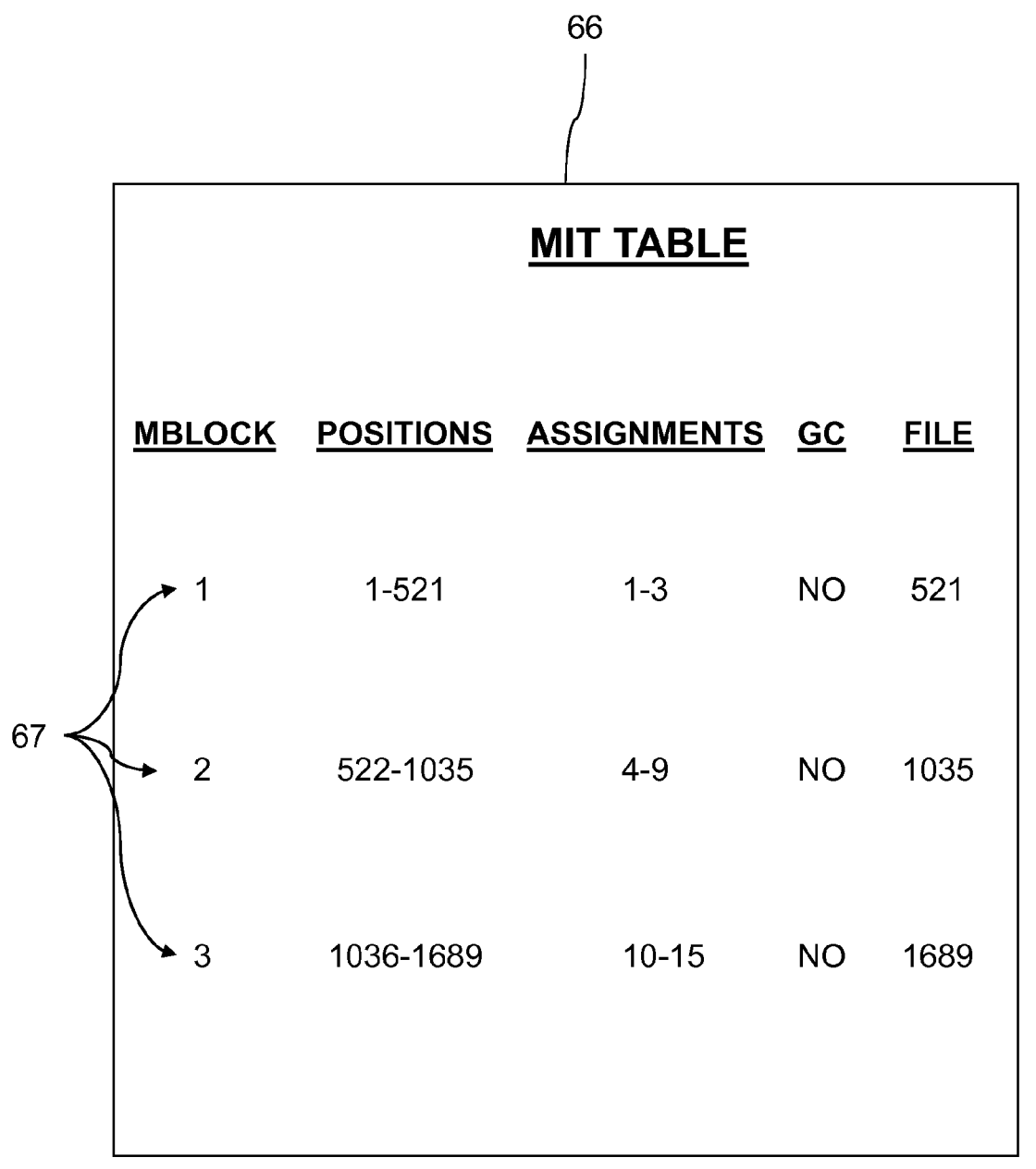

Reference is now made to FIG. 6, which is a block diagram view of an mblock indexing table 66 for use in the system 10 of FIG. 1.

The mblock indexing table (MIT) 66 provides information about the mblocks. For efficiency the MIT 66 is typically memory resident, generally in a memory with sufficiently high read/write performance such as RAM, by way of example only. However, a copy of the mblock indexing table 66 is also typically stored in the hard disk 30. The copy is typically updated whenever the memory resident mblock indexing table 66 is updated. The mblock indexing table 66 is created by the recording module 32 (FIG. 2). The mblock indexing table 66 is generally maintained by the recording module 32 (FIG. 2) and the purging module 36 (FIG. 2).

The mblock indexing table 66 includes an entry 67 for each mblock 60 (MBLOCK1, MBLOCK2 and MBLOCK3 of FIG. 5).

Each entry 67 typically includes: the range of positions covered by the mblock 60 (P1-P3 of MBLOCK1 corresponds to positions 1-521, P4-P6 of MBLOCK2 corresponds to positions 522-1035 and P7-P10 of MBLOCK3 corresponds to positions 1036-1689); the range of assignments/records 65 covered by the mblock 60 (MBLOCK1 includes assignments 1-3, MBLOCK2 includes assignments 4-9 and MBLOCK 3 includes assignments 10-15); whether the mblock has been "garbage collected" (GCed) or not; and a number that indicates the name of the mblock files (it is generally not necessary to store the entire string representation of the file name). As described above with reference to FIG. 5, the mblock file names are typically chosen so that the mblock file names can be implied from the entries 67 of the MIT 66, thereby keeping the MIT 66 as small as possible which is particularly important as the mblock indexing table 66 is typically memory resident.

The position information of each of the real assignments used in each mblock 60 is the same as when the data is stored in the single assignment file 42. However, it will be appreciated by those ordinarily skilled in the art that the position data used in each mblock 60 could be relative to the start of the mblock, with the real position offset being stored in the MIT 66. When the record structure of the assignment file 62 and the assignment file 42 are substantially the same, software/hardware used for recording, scanning and rendering the recorded data may be shared.

Organizing the data into the mblocks 60 allows garbage collection of unwanted mblocks 60 by the purging module 36 (FIG. 2) including deleting the assignment file(s) 62 and the value file(s) 64 of the unwanted mblock(s) 60. When an mblock is deleted, the MIT entry 67 for the mblock 60 is marked as GCed by the purging module 36 (FIG. 2). Alternatively, the MIT entry 67 for the mblock 60 is deleted from the mblock indexing table 66 by the purging module 36. Additionally organizing the data into mblocks 60 allows the MIT 66 to be used as an index table by the scanning module 34 (FIG. 2) to find the mblock 60 which includes a particular position for easier scanning.

Figure 7:
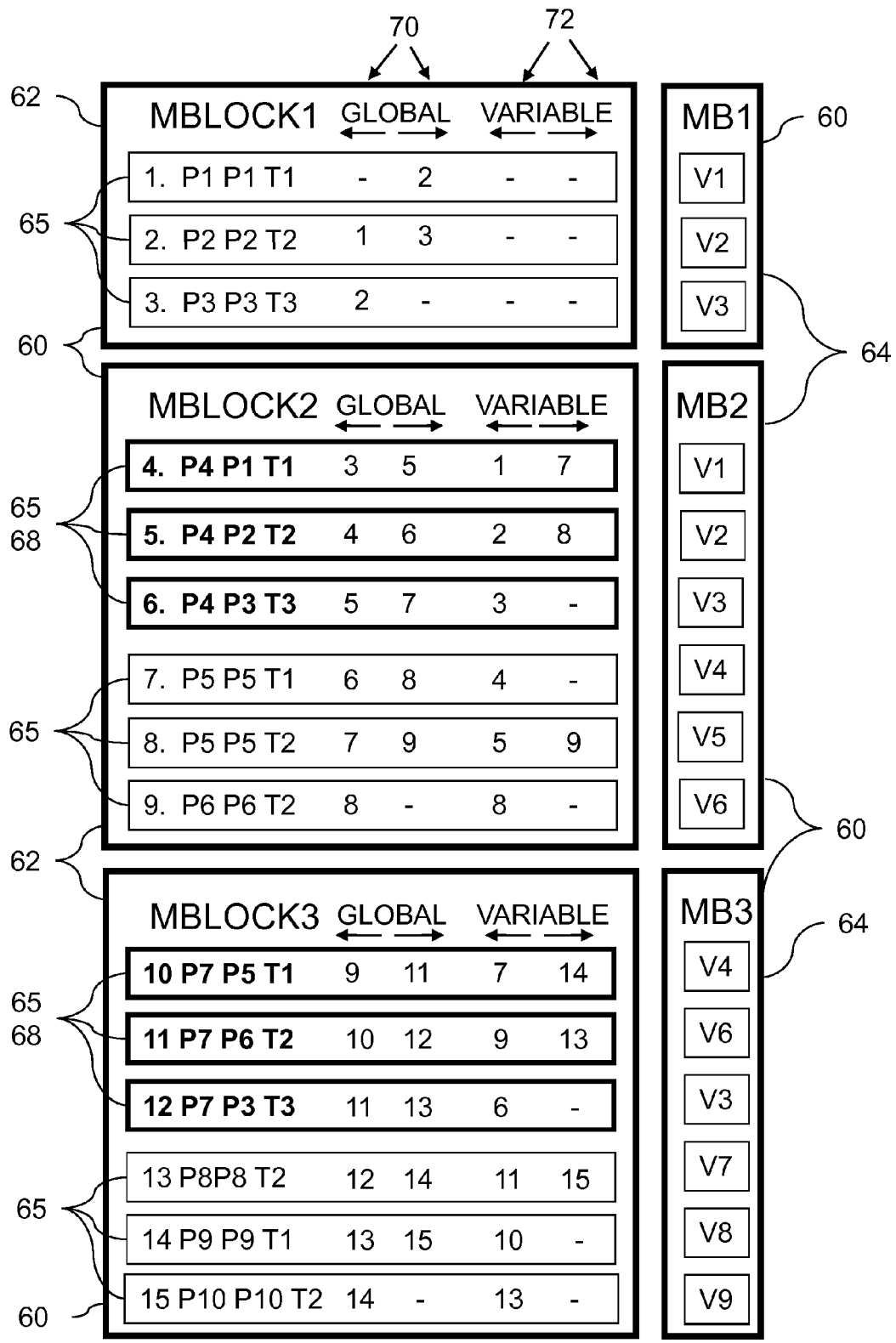
FIG. 7 is a partly pictorial, partly block diagram view of the mblocks of FIG. 5 with global and variable links.

Reference is now made to FIG. 7, which is a partly pictorial, partly block diagram view of the mblocks 60 of FIG. 5 with a plurality of global links 70 and variable links 72. As described above, the global links 70 and the variable links 72 are made with reference to the assignment/record number of the assignments and generally not the position of the assignments.

In FIG. 7, left pointing arrows indicate the backward links and right pointing arrows indicate the forward links.

During recording by the recording module 32 (FIG. 2), a record 65 of a current assignment is added to the assignment file 62 and an associated value is added to the value file 64. A reference (not shown) to the value in the value file 64 is added to the record 65 of the current assignment in the assignment file 62. A backward global link 70 is added to the record 65 in the assignment file 62 linking the current assignment record 65 to the previous assignment record 65. A backward variable link 72 is added to the assignment file 62 linking the record 65 of the current assignment to the record 65 of the previous assignment of the same variable as the current assignment. At the same time a backward link is created from the record 65 of the current assignment to a previous assignment record 65, a forward link is also created from the previous assignment record 65 to the current assignment record 65. The general exception to the creation of forward links is that forward links are only created within an mblock 60 and not from a previous mblock 60 to a next mblock 60, as will be described in more detail below.

In accordance with an alternative embodiment of the present invention, the mblocks 60 do not include backward links between the records 65 of the same mblock 60 and/or backward links between the records of different mblocks 60.

In accordance with an embodiment of the present invention, the mblocks 60 do not include any links between the records of different mblocks 60 both in the forward and backward direction.

When the recording module 32 (FIG. 2) decides to start a new mblock 60, the refresh region 68 is created by adding a record 65 for a most recently recorded assignment for each variable at the start of the new mblock 60 with the current value of that variable, as described with reference to FIG. 5.

As described above with reference to FIG. 5, for efficiency, the recording module 32 (FIG. 2) stores in memory the most recent position, assignment/record number and value of each variable. The position and value information from the previous mblock 60 is used to create the refresh region 68 in the new mblock 60 which includes the original positions and original values of the assignments. The position information is recorded in the assignment file 62 and the value information is recorded in the value file 64.

For the first assignment record 65 in the refresh region 68 of the new mblock 60, the recording module 32 (FIG. 2) creates a backward global link 70 to the last assignment record 65 of the previous mblock 60. Additionally, the recording module 32 (FIG. 2) creates a backward variable link 72 from the first assignment record 65 in the new mblock 60 to the last assignment record 65 of the same variable (as the first assignment record 65) in the previous mblock 60. The term "last assignment record" as used in the specification and claims is defined herein as the last assignment record 65 in terms of position order within one of the assignment files 62. The last assignment record 65 is not necessarily the last record 65 in terms of storage order within one of the assignment files 62.

Unlike backward links between the mblocks 60, the forward links from the previous mblock 60 are not created to the new mblock 60 as previously described. Therefore, the links created by the recording module 32 (FIG. 2) include the backward links 70, 72 from the records 65 of the refresh region 68 of the new mblock 60 to at least some of the records 65 of the previous mblock 60. However, the records 65 of the previous mblock 60 do not generally include any forward links to the records 65 of the refresh region 68 of the new mblock 60. The direction of the forward links and the backward links is defined with reference to the direction of increase of the positions of the assignments/records 65.

For the second assignment record 65 in the refresh region 68 of the new mblock 60, the recording module 32 (FIG. 2) creates a backward global link 70 to the first assignment record 65 of the new mblock 60. Additionally, the recording module 32 (FIG. 2) creates a backward variable link 72 from the second assignment record 65 to the record 65 of the last assignment of the same variable (as the second assignment variable) in the previous mblock 60.

The recording module 32 (FIG. 2) creates other assignment records 65 in the refresh region 68 of the new mblock 60, as necessary, including a global link 70 to the previous assignment record 65 in the new mblock 60 and a variable link 72 to the last assignment record 65 of the same variable in the previous mblock 60.

When a backward global link 70 is created from one assignment record 65 in the refresh region 68 to a previous assignment record 65 in the same refresh region 68, a forward global link 70 is also created from the previous assignment record 65 to the one assignment record 65.

New assignments are then recorded following the refresh region 68 as described above. For new assignment records 65 a backward global link 70 is added to the record 65 in the assignment file 62, linking the current assignment record 65 to the previous assignment record 65 even if the previous assignment record 65 is an assignment record 65 in the refresh region 68. A backward variable link 72 is added to the assignment file 62 linking the current assignment record 65 to the record 65 of the previous assignment of the same variable as the current assignment record 65 even if the record 65 of the previous assignment of the same variable is an assignment record 65 in the refresh region 68. Also, typically at substantially the same time, the backward link is created from the current assignment record 65 to a previous assignment record 65, a forward link is also created from the previous assignment record 65 to the current assignment record 65. Therefore, if the previous assignment record 65 is in the refresh region 68, a forward link is created from the previous assignment record 65 in the refresh region 68 to the current assignment record 65.

If a new assignment has the same current position as the assignment records 65 of the refresh region 68, and an existing assignment record 65 in the refresh region 68 is of the same variable as the new assignment, then the existing assignment record 65 is overwritten by the new assignment in the refresh region 68. The backward links 70, 72 of the existing assignment record 65 do not need to be updated. In the assignment file 62, the "original position" of the existing assignment record 65 is updated to the current position of the new assignment, so that the current position and original position are the same. If the value of the new assignment is the same size or smaller than the existing value of the existing assignment in the value file 64, then the existing value may be overwritten by the value of the new assignment. If the value of the new assignment is larger than the existing value, then the value of the new assignment can be appended to the value file 64 and a new reference from the new assignment in the refresh region 68 in the assignment file 62 is created to reference the value of the new assignment in the value file 64. Amending and/or adding values at the end of the value file 64 is discussed in more detail with reference to FIGS. 10 and 11 which describe late arrival assignments.

The last assignment records 65 of each variable in an mblock 60 (according to the position order in the data stream 58) are not linked to the next mblock 60. In other words, the recording module 32 (FIG. 2) is operative to set the forward links to the next mblock 60 of the last assignment records 65 of each variable in an mblock 60 to null, implying that the next assignments are in the next mblock 60. Therefore, when the scanning module 34 (FIG. 2) performs a scan from one mblock 60 to the next mblock 60, all the assignment records 65 in the refresh region 68 of the next mblock 60 are scanned until the desired assignment is found. Once the desired assignment is found, the scanning can utilize the forward links of the refresh region 68 to "walk" through the assignments of the next mblock 60.

Setting the forward links to the next mblock 60, of the last assignment records 65 of each variable (according to the position order in the data stream 58), to null generally means that the null links never need updating when a new mblock is created or when an mblock is deleted thereby increasing efficiency and reducing access to the hard disk 30 (FIG. 2). An exception of not updating null links is late arrivals discussed in more detail with reference to FIGS. 10 and 11.

The forward links of an assignment record 65 are always set to null as the assignment is being written to the assignment file 62. Within an mblock 60, as new assignments arrive, the forward links are then updated from null to a particular value as the new assignment records 65 are added to the assignment file 62, as described above. Typically, a certain number of assignments are stored in memory to make the updating of forward links more efficient. However, the forward links from one mblock 60 to the next mblock 60 are not updated.

Figure 8:
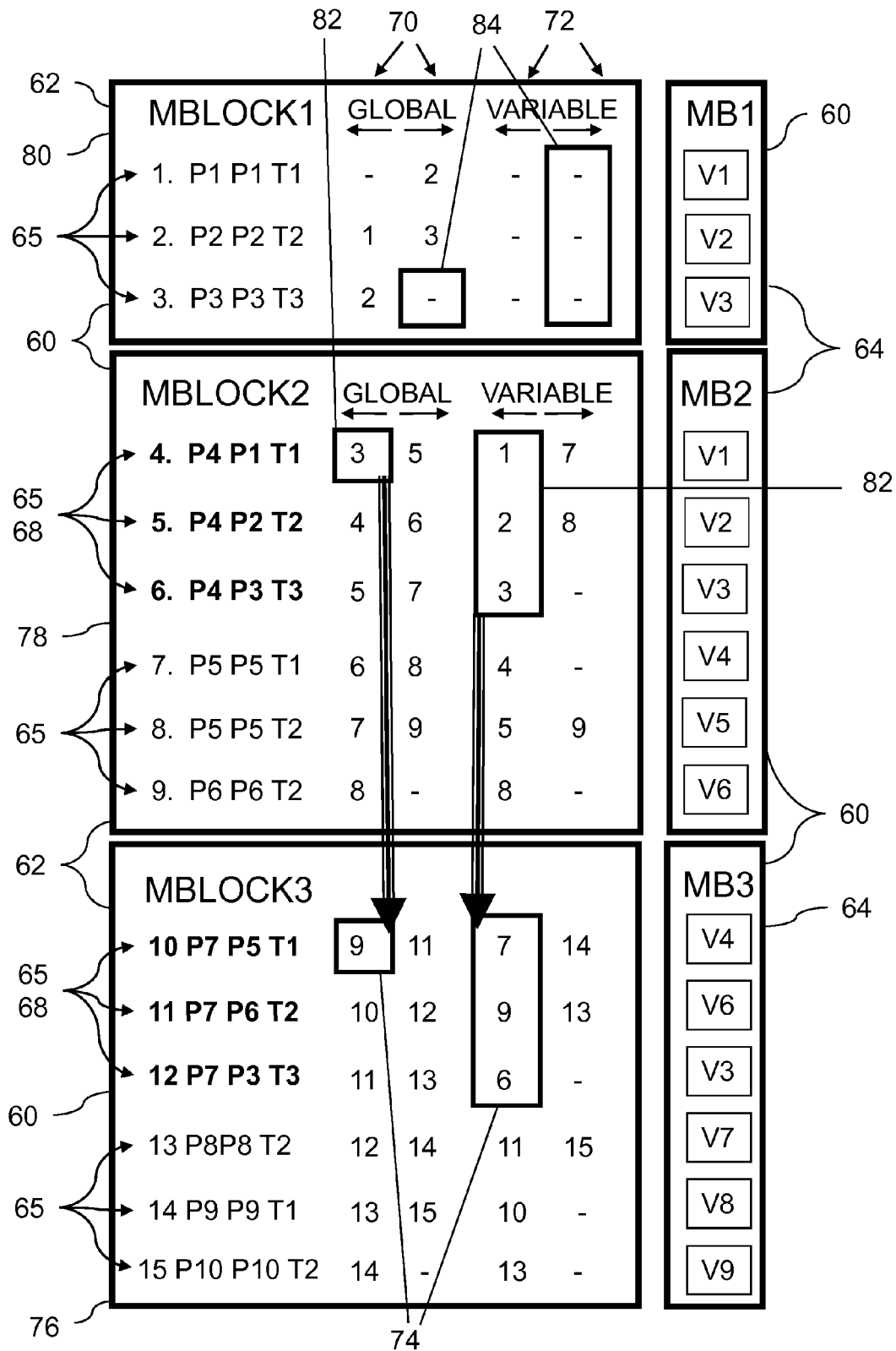
FIG. 8 is a partly pictorial, partly block diagram view of the mblocks of FIG. 7 prior to purging.

Reference is now made to FIG. 8, which is a partly pictorial, partly block diagram view of the mblocks 60 of FIG. 7 prior to purging, also known as garbage collection. In FIG. 8, the records 65 are shown without a box around each record 65 for the sake of clarity.

There may be various reasons for deleting mblocks 60 and not the whole data stream. For example, there may be a redundant review buffer for deletion stored between two recorded programs that the viewer wants to keep. A review buffer is a storage device used to record programs of the currently tuned channel so that if the viewer wants to review the programming of the current channel the programming is automatically recorded for review at a later time. The review buffer is typically purged by deleting the oldest content first.

If assignment records 65 including positions within a range between a first position and a second position are no longer needed, the purging module 36 (FIG. 2) is operative to first receive a request to delete the records 65. Then the purging module 36 is operative to identify the mblocks 60 which can be deleted by checking the mblock indexing table 66 (FIG. 6) to identify which mblocks 60 have a range of positions totally within the range between the first position and the second position.

So for example, if the assignment records 65 between P2 and P13 can be deleted, the purging module 36 (FIG. 2) checks the mblock indexing table 66 (FIG. 6) and determines that MBLOCK2 includes a range of positions totally within the range of P2 to P13. Therefore, MBLOCK2 can be deleted.

However, before MBLOCK2 is deleted, the purging module 36 updates some of the links 70, 72 so that the data can still be "walked through" using the links.

In general, an mblock 76, which is immediately after an mblock(s) 78 for deletion, has a plurality of backward links 74 in the refresh region 68 to the previous mblock 78. The backward links 74 in the refresh region 68 need to be updated to link to an mblock 80 immediately before the mblock(s) 78 to be deleted. So in the example of FIG. 8, the backward links 74 from MBLOCK3 to MBLOCK2 need to be updated to link to MBLOCK1 instead.

The backward links 74 are updated by copying a plurality of backward links 82 from the refresh region 68 of the mblock(s) 78 being deleted. Copying the backward links is generally efficient and enables updating several links with one disk access to the hard disk 30 (FIG. 2) to read the data and one disk access to write the data.

When more than one mblock 78 is being deleted, the backward links 82 are taken from the refresh region 68 of the first mblock 60 in the mblocks 78 being deleted. In other words, the mblock 78 closest, in position order, to the mblock 80 immediately before the mblock(s) 78 to be deleted is used for copying the links there from.

The backward links 74 which are updated are: the backward global link 70 of the first assignment record 65 in the refresh region 68 of the mblock 76; and the backward variable links 72 for each variable in the refresh region 68 of the mblock 76.

When the mblock(s) 78 are deleted, the forward links in the mblocks 60 do not need to be updated, since the forward links are always set to null when originally created. As described above, the forward links may retain the null value when the forward links belong to the last assignment record(s) 65 in the mblock 60 as the position of the next assignment record 65 may be ascertained from the MIT 66 (FIG. 6). So for example, a plurality of forward links 84 in the mblock 80 does not need to be updated.

The above deletion functions are performed by the purging module 36 (FIG. 2).

Figure 9:
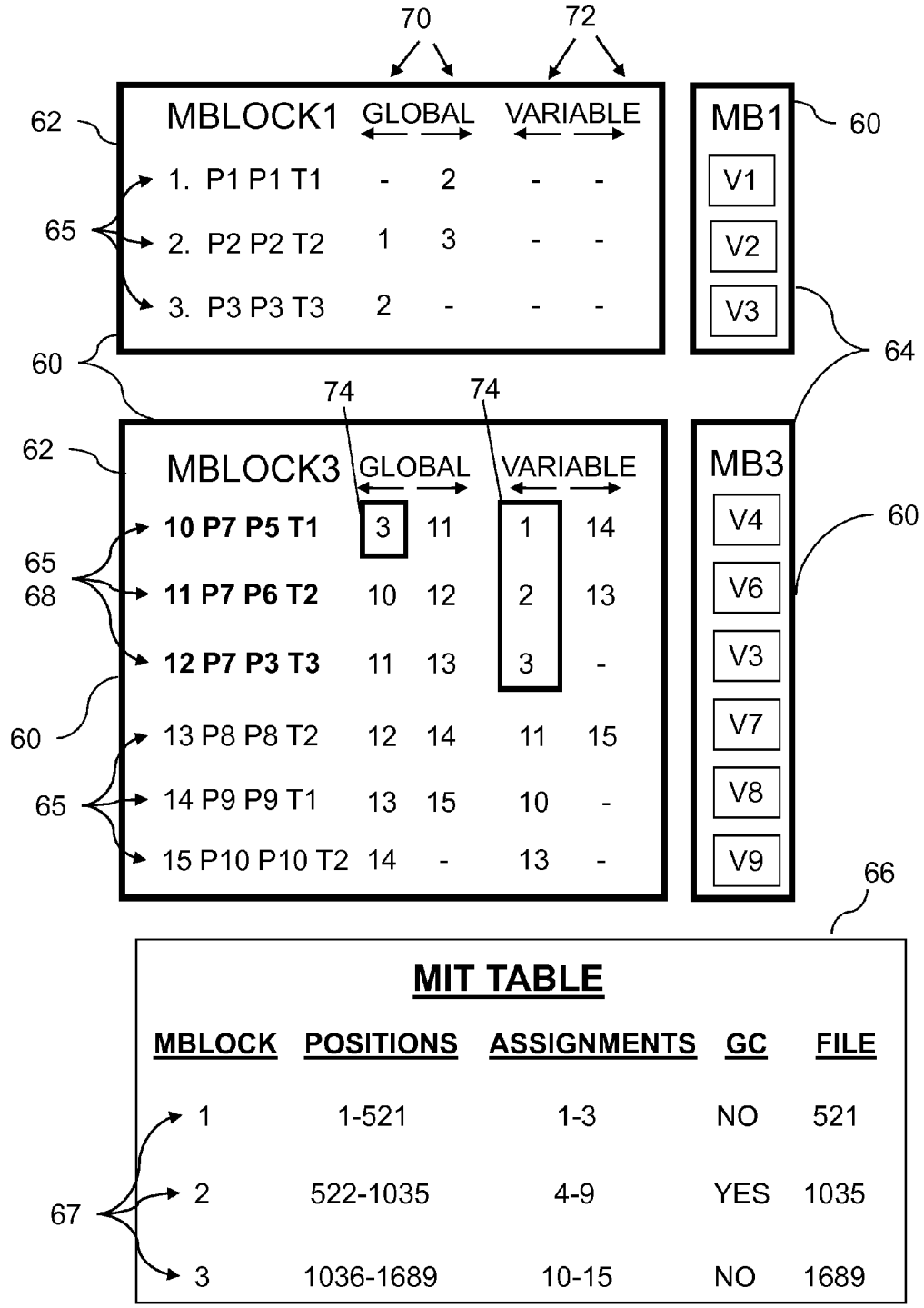
FIG. 9 is a partly pictorial, partly block diagram view of the mblocks of FIG. 8 after purging one of the mblocks.

Reference is now made to FIG. 9, which is a partly pictorial, partly block diagram view of the mblocks 60 of FIG. 8 after purging the mblock 78 (FIG. 8). In FIG. 9, the records 65 are shown without a box around each record 65 for the sake of clarity. FIG. 9 shows that the entry 67 for MBLOCK2 in the mblock indexing table 66 is now marked as GCed or garbage collected. The purging module 36 is operative to update the mblock indexing table 66 to reflect the deletion of the mblock 78 (MBLOCK2). FIG. 9 also shows that the backward links 74 have been updated in MBLOCK3 and reference records 65 in MBLOCK1.

In some cases it is may be desirable to truncate the most recent part of the data stream, for example, but not limited to, if the recording is interrupted by power failure and the end of the recorded stream is corrupted. Truncation typically results in one of the following: simply removing some assignments at the end of a single mblock 60 and updating the links without removing the mblock 60; or removing one or more mblocks and updating the links and the MIT 66 and triggering garbage collection.

Figure 10:
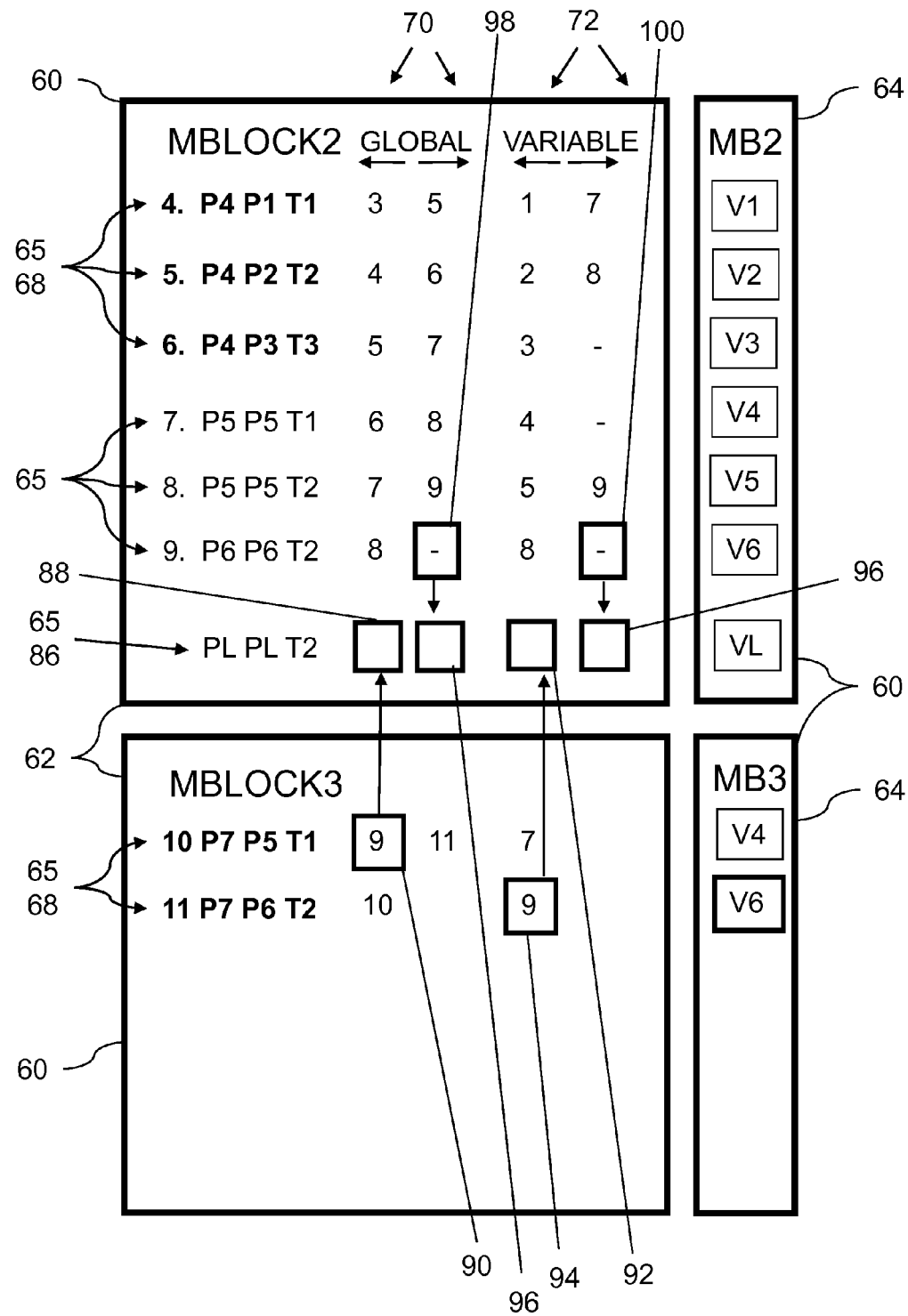
FIG. 10 is a partly pictorial, partly block diagram view showing the late arrival of an assignment in the system of FIG. 1.
Figure 11:
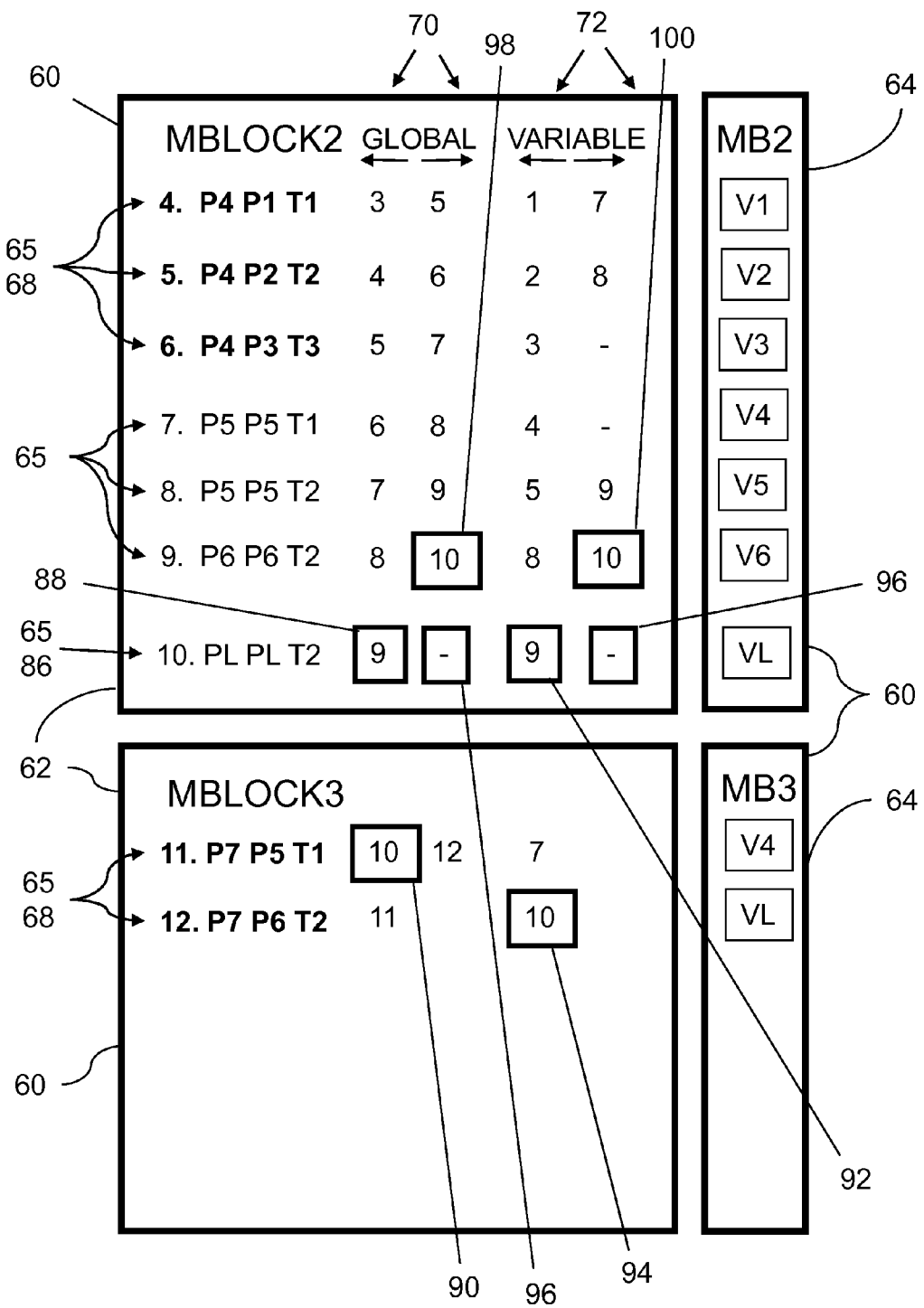
FIG. 11 is a partly pictorial, partly block diagram view showing the state of the mblocks after the inclusion of the late arrival of FIG. 10.

Reference is now made to FIGS. 10 and 11. FIG. 10 is a partly pictorial, partly block diagram view showing the late arrival of an assignment 86 in the system of FIG. 1. FIG. 11 is a partly pictorial, partly block diagram view showing the state of the mblocks 60 after the inclusion of the late arrival assignment 86 of FIG. 10. In FIGS. 10 and 11, the records 65 are shown without a box around each record 65 for the sake of clarity.

After a new block 60 (MBLOCK3) has been created and data is recorded in the new mblock 60 (MBLOCK3), the late arrival assignment 86 has arrived at the recording module 32 (FIG. 2) for recording. However, the late arrival assignment 86 has a position which belongs to the previous mblock 60 (MBLOCK2) and not to the new mblock 60 (MBLOCK3).

Therefore, the assignment 86 needs to be added to the previous mblock 60 (MBLOCK2). The assignment/record numbers in the new mblock 60 typically need to be updated (pushed forward). FIG. 11 shows that the record numbers have been updated and the assignment 86 has been assigned record 10, the other records 65 have been updated (pushed forward) accordingly. The late arrival assignment 86 is added to the previous mblock 60 (MBLOCK2) by the recording module 32 (FIG. 2).

In accordance with an alternative embodiment of the present invention, in order to prevent the need to update the record numbers in the new mblock 60 (MBLOCK3), the following is performed. When the new mblock 60 (MBLOCK3) is created, the record numbers of the new mblock 60 (MBLOCK3) are assigned to start at a certain number from the last record 65 of the previous mblock 60 (MBLOCK2), skipping one or more record numbers, thereby leaving spare record numbers between the mblocks 60 (between MBLOCK2 and MBLOCK3). Therefore, late arrivals can be assigned one of the spare record numbers without having to update the record numbers of other assignment record(s) 65.

Additionally, the recording module 32 is operative to update some of the global links 70 and the variable links 72 of the previous mblock 60 (MBLOCK2) and the new mblock 60 (MBLOCK3). In general, the exact links 70, 72 to be updated generally depends on the position of the record 65 of the assignment 86 in the previous mblock 60 (MBLOCK2), the variable of the assignment 86, and how much data has been written in the new block (MBLOCK3).

FIG. 10 shows the status of the links 70, 72 before the links are updated. FIG. 11 shows the status of the links 70, 72 after the links have been updated for the addition of the assignment 86.

The following link and value updates assume that the assignment 86 is now the last assignment record 65 in the previous mblock 60 (MBLOCK2) as shown in FIG. 10. However, it will be appreciated by those ordinarily skilled in the art that processing of late arriving assignments may be performed even if the assignment 86 has a position prior to the last assignment record 65 in the previous mblock 60.

The backward global link 70 (block 88) of the record 65 of the assignment 86 in the previous mblock 60 (MBLOCK2) is created by copying the backward global link 70 (block 90) of the first assignment record 65 of the refresh region 68 of the new mblock 60 (MBLOCK3).

The backward variable link (block 92) of the record 65 of the assignment 86 in the previous mblock 60 (MBLOCK2) is created by copying the backward variable link 70 (block 94) of the record 65 of the first assignment of the same variable as the variable of the assignment 86 in the refresh region 68 of the new mblock 60 (BLOCK3).

The forward global and variable links (blocks 96) of the record 65 of the assignment 86 in the previous mblock 60 (MBLOCK2) are set to null.

The forward global link 70 (block 98) of the record 65 of the assignment prior to the assignment 86, in position order, in the previous mblock 60 (MBLOCK2), needs to be updated to point to the record 65 of the assignment 86.

The forward variable link 72 (block 100) of the record 65 of the assignment of the same variable as the assignment 86 prior to the assignment 86, in position order, in the previous mblock 60 (MBLOCK2), needs to be updated to point to the record 65 of the assignment 86. As the position of the assignment of the same variable as the assignment 86 prior to the assignment 86 is generally known from the assignment in the refresh region 68, there is generally no need to search the global links in order to find the desired assignment.

The backward global link 70 (block 90) of the first assignment record 65 of the refresh region 68 of the new mblock 60 (MBLOCK3) is updated to point to the new last record 65 (assignment 86) in the previous mblock 60 (MBLOCK2).

The backward variable link 70 (block 94) of the first assignment record 65 of the same variable as the variable of the assignment 86 in the refresh region 68 of the new mblock 60 (BLOCK3) is updated to point to the record 65 of the assignment 86 in the previous mblock 60 (MBLOCK2).

Also, the value of the assignment 86 needs to be added to the value file 64 of the previous mblock 60 (MBLOCK2). When global references from the assignment files 62 to the value files 64 are used, as described above with reference to FIG. 5, it is generally more convenient to leave spare room at the end of each value file 64 for the values of possible late arrivals to be inserted in the spare room.

The value of the assignment 86 needs to be added to the refresh region 68 in the value file 64 of the new mblock 60 (MBLOCK3) to replace the value of what was previously thought to be the final value ("old final value") of the variable of the assignment 86 in the previous mblock 60 (MBLOCK2).

If the value of the assignment 86 is the same size or smaller than the old final value, then the old value may be overwritten by the value of the assignment 86 in the value file 64 of the new block 60 (MBLOCK3).

If the value of the assignment 86 is larger than the old final value, then the value of the assignment 86 can be appended to the end of the value file 64 of the new mblock 60

(MBLOCK3) and the reference from the record 65 of the assignment 86 in the refresh region 68 in the assignment file 62 is overwritten to reference the value of the assignment 86 in the value file 64. It will be appreciated that adding the value of the assignment 86 to the end of the value file 64 is more efficient than inserting the value in the position of the old final value by shifting all the subsequent values in the value file 64 of the new mblock 60. However, it should be noted that although it is more convenient at recording time to add the assignment 86 to the previous mblock 60, it is generally less efficient at playback time as there may be jumping around the disk in the value file 64 during "notification" of the assignments and the values.

The "original position" field of the record 65 of the assignment 86 in the refresh region 68 of the new mblock 60 is generally updated to the original position of the late arriving assignment 86 in the previous mblock 60.

The mblock indexing table 66 (FIG. 6) also needs to be updated to reflect the addition of the assignment 86.

In accordance with an alternative embodiment of the present invention, the assignment 86 could be added to the new mblock 60 (MBLOCK3) by adjusting the range of positions covered by the new mblock 60 (MBLOCK3) to include the position of the newly arrived assignment 86. Similarly, if there are assignments in the previous mblock 60 that have a position after the assignment 86 then the assignment with a position after the assignment 86 also need to be moved to the new mblock 60.

The processing of the late arrival of assignment 86 including updating the links and values in the assignment files 62, the value files 64 and the mblock indexing table 66 are typically performed by the recording module 32 (FIG. 2). It will be appreciated that more than one assignment may arrive late and the late arrivals may arrive out of position order of the other later arrival(s). In such a case, the links and other values need to be updated accordingly. It should be noted that although assignments may arrive out of position order, assignments of the same variable generally arrive in position order with respect to each other. In accordance with an embodiment of the present invention, assignments of the same variable that arrive out-of-order will be ignored.

Reference is again made to FIGS. 6 and 7.

Finding an assignment/record 65 is now described below.

In order to find an assignment/record 65 at position P, the scanning module 34 (FIG. 2) searches the MIT 66, to find the mblock 60 whose range includes P, and then, starting at the refresh region 68 of the found mblock 60, the scanning module 34 (FIG. 2) follows the forward links 70 in the mblock 60, until the required position P is found thereby finding the desired assignment/record 65.

Scanning assignments during playback is now described below.

During playback, the scanning module 34 (FIG. 2) typically "walks" through the data stream in position order and notifies the type, value and position of every assignment to any appropriate module. For example, TECMs are notified to a security/decryption module (not shown) which may be part of the playback module 38 (FIG. 2). As the scan proceeds, the scanning module 34 typically stores the position of the last notification of each variable generally used in deciding whether to notify assignments in the refresh region 68, described in more detail below.

When the scan by the scanning module 34 (FIG. 2) reaches an assignment record 65 in the refresh region 68 (flagged for example by different values of the "position" and "original position" fields in the record 65), the assignment record 65 in the refresh region 68 is only notified if the "original position" field of the assignment record 65 in the refresh region 68 is different from the position of the last notification of the same variable as the assignment in the current scan. The notification in such a case includes the original position of the assignment as the position value.

When the scanning module 34 (FIG. 2) scans the assignment chain and reaches a forward link with a null value, the scanning module 34 (FIG. 2) typically refers to the MIT 66 to find the next non-garbage collected mblock 60 and the scanning module 34 (FIG. 2) continues scanning from the position of the next non-garbage collected mblock 60.

Scanning the data stream backwards works in substantially the same way as forward scanning, the difference being that backward links 70, 72 link one mblock 60 to another mblock 60 in the backwards direction.

The size of an mblock (for example, but not limited to, measured in number of assignments/records 65 or recording time or a combination thereof) is a tradeoff of many factors such as: the granularity of the garbage collection operations (larger blocks means that disk space is released more slowly); performance issues (smaller mblocks means that garbage collection can be performed more often); and time to scan the links for a given position (the longer the mblock, the more time is needed to scan the mblock to find the required position). By way of example only, in an MPEG-2 stream an mblock size of 15 minutes or 10 megabytes, whichever is smaller, may be appropriate when the typical content item has a duration of one hour. However, it will be appreciated by those ordinarily skilled in the art that the mblock may have any suitable size.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A device for recording at least part of a data stream therein, the data stream including a plurality of instances of a plurality of event types such that each one of the event types has at least one of the instances in the data stream, the data stream also including a plurality of positions such that each of the instances is located at one of the positions or within a range of the positions, each of the instances having a value, the device including a recording module to:

record a plurality of records divided among a plurality of segments, the records including an instance record for each of the instances, the instance record of each one of the instances including: the one event type of the one instance and at least one of the positions identifying the one instance, each of the segments covering a range of the positions in the data stream such that different segments cover different ranges of the positions, wherein the arrival order of the instances arriving at the recording module may be out of position order, the recording module being operative to record the instance records of each one of the plurality of segments by appending the instance records to the one segment according to the arrival order of the instances;

record the value of each one of the instances such that: the instance record of the one instance includes the value of the one instance; or the value of the one instance is stored externally to the instance record of the one instance, the instance record of the one instance including a reference to the externally stored value of the one instance;

create a refresh region at the beginning and/or the end of each of the segments, the refresh region including a plurality of refresh region records such that the records in each of the segments include the instance record for each of the instances and the refresh region records, the refresh region records including data from a most recently recorded instance record of each one of the event types such that each of the refresh region records includes the data for a different one of the event types, wherein the refresh region record of the one event type includes: the at least one position identifying the most recently recorded instance record of the one event type; the one event type; and the value of the most recently recorded instance record of the one event type or a reference to the value of the most recently recorded instance record of the one event type;

create a plurality of links between the records to enable traversing the records in position order even when the instance records are recorded out of position order, wherein the links include: a plurality of bidirectional links between nearest neighbors of the records, independent of the event-types, in the one segment, the nearest neighbors being nearest neighbors according to the positions included in the records; and a plurality of bidirectional links between nearest neighbors of the records of the same one of the event types in the one segment; and create an indexing table including an entry for each of the segments, the entry for each one of the segments including the range of the positions covered by the records of the one segment.

2. The device according to claim 1, further comprising a scanning module to: find a particular one of the recorded instances identified by a desired position of the positions by searching the indexing table to find a particular segment of the segments including the desired position; and follow the links of the particular segment until the particular instance identified by the desired position is found.

3. The device according to claim 2, wherein the scanning module is operative to use the refresh region of the one segment to ascertain the value of any one of the event-types in the position range of the one segment by scanning from the refresh region of the one segment instead of from the beginning of the data stream.

4. The device according to claim 1, wherein the recording module is operative to record the records of one of the segments in a first file and the records of another one of the segments in a second file.

5. The device according to claim 1, wherein the recording module is operative to create the refresh region at the beginning of each one of the segments such that the refresh region record of the one event type of the one segment includes: the at least one position identifying the most recently recorded instance record of the one event type recorded by the recording module in a previous one of the segments; and the value of the most recently recorded instance record of the one event type recorded in the previous one segment or a reference to the value of the most recently recorded instance record of the one event type recorded in the previous one segment, wherein the positions included in the records of the previous one segment are earlier positions in the stream than the positions included in the records of the one segment.

6. The device according to claim 5, wherein:
the recording module is operative to first create the records of the previous segment and then create the records of the refresh region of the one segment;
after the recording module starts creating the records of the refresh region of the one segment, a late arrival instance of the instances arrives at the recording module, the late arrival instance having a position belonging to the previous segment;
the recording module is operative to add the late arrival instance to the previous segment; and
the recording module is operative to update at least some of the links in the previous segment and the one segment as a result of adding the late arrival instance to the previous segment.

7. The device according to claim 6, wherein the recording module is operative to update at least part of the records of the refresh region of the one segment to reflect the addition of the late arrival instance to the previous segment.

8. The device according to claim 1, wherein the links include a plurality of backward links from the records of the refresh region of the one segment to at least some of the records of the previous segment, wherein the records of the previous segment do not include any forward links to the records of the refresh region of the one segment, a direction of the forward links and the backward links being defined with reference to a direction of increase of the positions.

9. The device according to claim 1, wherein the segments do not include any links between the records of the one segment and the records of the previous segment.

10. The device according to claim 1, further comprising a purging module to:
receive a request to delete some of the records, the positions included within the some records having a range between a first position of the positions and a second position of the positions;
check the indexing table to identify at least one of the segments having a range of the positions totally within the range between the first position and the second position;
delete the at least one segment; and
update the indexing table to reflect the deletion of the at least one segment.

11. The device according to claim 10, wherein the purging module is operative to:
prior to deleting the at least one segment, update at least some of the links included in the records of the refresh region of a first segment of the segments, the first segment being adjacent in position order to the at least one segment.

12. The device according to claim 1, wherein the event types include at least one of the following: an I-frame, a B-frame, a P-frame, a program map table, a control message and a program clock reference.

13. The device according to claim 1, wherein the event type is a data type.

14. A method for recording at least part of a data stream, the data stream including a plurality of instances of a plurality of event types such that each one of the event types has at least one of the instances in the data stream, the data stream also including a plurality of positions such that each of the instances is located at one of the positions or within a range of the positions, each of the instances having value, the method comprising:

recording a plurality of records divided among a plurality of segments, the records including an instance record for each of the instances, the instance record of each one of the instances including: the one event type of the one instance and the at least one of the positions identifying the one instance, each of the segments covering a range of the positions in the data stream such that different segments cover different ranges of the positions, wherein the arrival order of the instances arriving for recording may be out of position order, the instance records of each one of the plurality of segments being recorded by appending the instance records to the one segment according to the arrival order of the instances;

recording the value of each one of the instances such that: the instance record of the one instance includes the value of the one instance; or the value of the one instance is stored externally to the instance record of the one instance, the instance record of the one instance including a reference to the externally stored value of the one instance;

creating a refresh region at the beginning and/or the end of each of the segments, the refresh region including a plurality of refresh region records such that the records in each of the segments include the instance record for each of the instances and the refresh region records, the refresh region records including data from a most recently recorded instance record of each one of the event types such that each of the refresh region records includes the data for a different one of the event types, wherein the refresh region record of the one event type includes: the at least one position identifying the most recently recorded instance record of the one event type; the one event type; and the value of the most recently recorded instance record of the one event type or a reference to the value of the most recently recorded instance record of the one event type;

creating a plurality of links between the records to enable traversing the records in position order even when the instance records are recorded out of position order, wherein the links include: a plurality of bidirectional links between nearest neighbors of the records, independent of the event-types, in the one segment, the nearest neighbors being nearest neighbors according to the positions included in the records; and a plurality of bidirectional links between nearest neighbors of the records of the same one of the event types in the one segment; and creating an indexing table including an entry for each of the segments, the entry for each one of the segments including the range of the positions covered by the records of the one segment.

* * * * *

UNITED STATES PATENT AND TRADEMARK OFFICE
CERTIFICATE OF CORRECTION

PATENT NO. : 8,554,051 B2  
APPLICATION NO. : 13/138009  
DATED : October 8, 2013  
INVENTOR(S) : Lehman et al.

It is certified that error appears in the above-identified patent and that said Letters Patent is hereby corrected as shown below:

In the Claims

In column 23, line 2, claim 14, delete "having value," and substitute therefor --having a value,--.

Signed and Sealed this
Twenty-sixth Day of November, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO. : 8,554,051 B2  Page 1 of 1
APPLICATION NO. : 13/138009
DATED : October 8, 2013
INVENTOR(S) : Lehman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 178 days.

Signed and Sealed this
Fifteenth Day of September, 2015

Michelle K. Lee
*Director of the United States Patent and Trademark Office*